(12) United States Patent
Bishop, III et al.

(10) Patent No.: US 12,014,210 B2
(45) Date of Patent: Jun. 18, 2024

(54) DYNAMIC RESOURCE ALLOCATION IN A DISTRIBUTED SYSTEM

(71) Applicant: Bank of America Corporation, Charlotte, NC (US)

(72) Inventors: Jack Lawson Bishop, III, Evanston, IL (US); Jason Conrad Starin, Huntersville, NC (US); Carrie E. Gates, Livermore, CA (US)

(73) Assignee: Bank of America Corporation, Charlotte, NC (US)

( * ) Notice: Subject to any disclaimer, the term of this patent is extended or adjusted under 35 U.S.C. 154(b) by 406 days.

(21) Appl. No.: 17/386,314

(22) Filed: Jul. 27, 2021

(65) Prior Publication Data
US 2023/0031049 A1 Feb. 2, 2023

(51) Int. Cl.
*G06F 9/48* (2006.01)
*G06F 9/50* (2006.01)
*G06N 20/00* (2019.01)

(52) U.S. Cl.
CPC .......... *G06F 9/4881* (2013.01); *G06F 9/5027* (2013.01); *G06N 20/00* (2019.01)

(58) Field of Classification Search
CPC .................. G06F 9/4881; G06F 9/5027; G06F 2209/5021; G06F 2209/508; G06N 20/00
See application file for complete search history.

(56) References Cited

U.S. PATENT DOCUMENTS

| | | | |
|---|---|---|---|
| 6,917,926 B2 | 7/2005 | Chen et al. | |
| 7,359,979 B2 | 4/2008 | Gentle et al. | |
| 8,856,936 B2 | 10/2014 | Datta Ray et al. | |
| 9,501,749 B1 | 11/2016 | Narsky | |
| 9,723,105 B2 | 8/2017 | Vange et al. | |
| 10,083,481 B2 | 9/2018 | Futch et al. | |
| 10,164,891 B2 | 12/2018 | Stanwood et al. | |
| 10,241,505 B2 | 3/2019 | Cohen et al. | |
| 10,291,584 B2 | 5/2019 | Koripella et al. | |
| 10,389,592 B2 | 8/2019 | Lui et al. | |
| 10,420,017 B2 | 9/2019 | Pinheiro et al. | |
| 10,482,394 B2 | 11/2019 | Syed et al. | |
| 10,511,560 B2 | 12/2019 | Kursun et al. | |

(Continued)

OTHER PUBLICATIONS

Bishop III, J. L. et al. "Query-Response System for Identifying Application Priority," U.S. Appl. No. 17/386,361, filed Jul. 27, 2021, 69 pages.

(Continued)

*Primary Examiner* — Jorge A Chu Joy-Davila

(57) ABSTRACT

A prioritization system includes a memory that stores an access record with, for each of the users, an indication of a previous usage of computing applications. The memory stores a permission record with, for each of the users, an indication of the computing applications that the user is permitted to access. The memory stores user affinities that include, for each of the users, an affinity score corresponding to a predetermined ability level of the user to engage in an activity associated with one or more of the computing applications. The prioritization system determines a priority score for each of the users. In response to receiving a request for a priority of a first user of the users, the prioritization system provides a response with the priority score determined for the first user of the users.

17 Claims, 8 Drawing Sheets

(56) References Cited

U.S. PATENT DOCUMENTS

| | | |
|---|---|---|
| 10,521,464 B2 | 12/2019 | Juneja et al. |
| 10,574,748 B2 | 2/2020 | Doddavula et al. |
| 10,609,045 B2 | 3/2020 | Lim |
| 10,755,195 B2 | 8/2020 | Motahari Nezhad |
| 10,771,352 B2 | 9/2020 | Jasen et al. |
| 10,805,235 B2 | 10/2020 | Kulkarni et al. |
| 10,884,813 B2 | 1/2021 | Yang et al. |
| 10,891,161 B2 | 1/2021 | Zhou et al. |
| 10,904,389 B2 | 1/2021 | Wolthuis et al. |
| 10,938,535 B2 | 1/2021 | Segev et al. |
| 10,908,960 B2 | 2/2021 | Qiu et al. |
| 10,908,967 B2 | 2/2021 | Schmidt et al. |
| 10,925,009 B2 | 2/2021 | Gutierrez et al. |
| 10,929,198 B2 | 2/2021 | Liu |
| 10,936,978 B2 | 3/2021 | Tijerina et al. |
| 10,938,738 B2 | 3/2021 | Dronen et al. |
| 10,938,741 B2 | 3/2021 | Hathorn et al. |
| 10,939,167 B2 | 3/2021 | Chao |
| 10,999,859 B2 | 5/2021 | Tang |
| 2008/0016214 A1* | 1/2008 | Galluzzo ............... H04L 67/61 709/226 |
| 2008/0040364 A1 | 2/2008 | Li |
| 2010/0049852 A1* | 2/2010 | Whitnah ............... H04L 67/53 709/226 |
| 2015/0026824 A1* | 1/2015 | Kim ............... H04N 21/44224 726/28 |
| 2019/0220314 A1* | 7/2019 | Borra ............... G06F 11/3058 |
| 2019/0243644 A1 | 8/2019 | Jose et al. |
| 2020/0082021 A1* | 3/2020 | Haze ............... G06Q 20/405 |
| 2020/0267066 A1 | 8/2020 | Pang et al. |
| 2021/0089362 A1 | 3/2021 | Iwasa et al. |
| 2021/0100023 A1 | 4/2021 | Wei et al. |
| 2021/0105197 A1 | 4/2021 | Balle et al. |
| 2021/0111843 A1 | 4/2021 | Zhang |
| 2021/0112546 A1 | 4/2021 | Adamou et al. |
| 2021/0127417 A1 | 4/2021 | Lee et al. |
| 2021/0136785 A1 | 5/2021 | Elsayed et al. |
| 2021/0318935 A1* | 10/2021 | Jacobs ............... G06F 11/1469 |

OTHER PUBLICATIONS

Bishop III, J. L. et al., "Application Prioritization System," U.S. Appl. No. 17/344,712, filed Jun. 10, 2021, 40 pages.

* cited by examiner

DYNAMIC RESOURCE ALLOCATION IN A DISTRIBUTED SYSTEM

TECHNICAL FIELD

The present disclosure relates generally to computing application and infrastructure resource allocation management. More particularly, the present disclosure is related to dynamic resource allocation in a distributed system.

BACKGROUND

Specialized and scarce computing or other resources for enabling remediation of computing applications may be distributed amongst a number of different computing applications, users, computing devices, or servers. Computing applications are generally used to perform computing tasks, such as analyzing information, presenting information, storing information, and the like.

SUMMARY

Previous technology used to manage computing application resource constraints may suffer from a number of drawbacks. For example, previous technology can be inefficient and provides little or no insights into the relative importance of a given application for meeting the needs of users, organizations, businesses, working groups, or the like. For example, previous technology is unable to automatically identify computing applications that are more critical for ensuring required tasks can be efficiently and reliably completed in a timely manner. As such, the allocation of infrastructure (e.g., server space, computing nodes, application security remediation, etc.) for these applications is inefficient and can fail to meet business needs, such that certain required tasks may not be completed successfully or on time (e.g., application security remediation). Furthermore, specialized and/or scarce users (e.g., individuals with specialized training, knowledge, and/or responsibilities) may be tasked with advising those responsible for creating and maintaining computing applications. Those specialized/scarce users may be a constraint for completing tasks requested by computing application teams. This disclosure recognizes that machine-learning-derived prioritization can help prioritize and defend resource allocation and can act as an indicator for constraint analysis and related activities.

Certain embodiments of this disclosure provide unique solutions to technical problems of previous application management technology, including those problems identified above, by providing tools for reliably and efficiently determining relative prioritizations for different computing applications, for example, such that appropriate infrastructure or other resources can be allocated to higher priority applications. For example, the disclosed systems can be integrated into practical applications that provide several technical advantages over previous technology, which include: (1) providing previously unavailable insights into the relative ranking of computing applications with respect to real-world tasks being completed with the applications; (2) providing fine-grained application priority information for a large or distributed computing infrastructure; and (3) facilitating the analysis of possible scenarios and their impact on application prioritization and/or infrastructure functionality. As such, this disclosure may improve the function of computer systems used to help manage computing applications and associated hardware infrastructures, such that, for example, the appropriate hardware or user action (e.g., application security remediation, processing, memory, and networking resources) can be made available for prioritized computing applications.

In certain embodiments, this disclosure may particularly be integrated into a practical application of an application prioritization system, which uses a specially structured machine learning model along with linear regression in order to iteratively determine priorities for different computing applications. This analysis may be geared towards providing a response to a particular request or query for information. For instance, the application prioritization system may provide human-interpretable metrics that can be used to not only adjust resource allocation based on application priority but also understand the underlying types or categories of applications that require prioritization. For example, the application prioritization system may automatically generate a response indicating that a given application is more critical than another application because of one or more user-, business-, or organization-based needs. For instance, a word-processing application that is used by a majority of users may be prioritized over a specialized application used by only a handful of users. Information determined by the application prioritization system may be used to reallocate computing applications or user action(s) amongst available computing resources, such that more resources are available to higher priority applications (e.g., using the resource management system described with respect to FIGS. 7 and 8 below).

In certain embodiments, this disclosure may particularly be integrated into a practical application of an application and/or user prioritization system, which uses records of the use of applications, users' permissions to access applications, users' affinities for engaging in applications using applications, and/or predetermined application prioritizations (e.g., determined by the application prioritization system described briefly above) to determine user priorities and/or user-specific application priorities. In some cases, this analysis may be geared towards providing a response to a particular request or query for information. For instance, the application and/or user prioritization system may provide human-interpretable metrics that can be used to not only adjust resource allocation based on application priority but also understand the users and/or applications that should be prioritized. For example, the application and/or user prioritization system may automatically generate a response indicating that a given application is more critical for a given user than another application for that user. A user-specific application priority may be different than the more generalized application priorities determined by the application prioritization system described briefly above (see also FIGS. 1-3). As another example, the application and/or user prioritization system may identify one or more users who should be prioritized, for example, by providing additional support to the users (e.g., additional access to infrastructure, software access, training, etc.). Information determined by the application and/or user prioritization system may be used to reallocate computing applications and/or user action(s) amongst available computing resources, such that more resources are available to higher priority applications (e.g., using the resource management system described with respect to FIGS. 7 and 8 below).

In certain embodiments, this disclosure may particularly be integrated into an automatic resource management system that uses application and/or user priorities to automatically adjust the allocation of system resources (e.g., to adjust hardware and/or software allocation amongst hosting devices, adjust access to users, adjust the allocation or scheduling of training to users, etc.). The resource management system may use application and/or user prioritizations to automatically install computing applications that are determined to be needed on a computing device (e.g., a device hosting applications used by users to complete tasks), such that these applications are more reliably available than was possible using previous technology. In some cases, the resource management system may use application and/or user prioritizations to automatically grant users' permission to access computing devices and/or installed applications, such that users are able to complete tasks in a timely manner with little or none of the delays exhibited by previous technology. The resource management system may use application and/or user prioritizations to automatically allocate hardware resources (e.g., memory, processors, network bandwidth, etc.) to computing devices, such that adequate resources are available to support future demands to complete necessary tasks.

Certain embodiments of this disclosure may include some, all, or none of these advantages. These advantages and other features will be more clearly understood from the following detailed description taken in conjunction with the accompanying drawings and claims.

In an embodiment, a system includes a computing infrastructure and an application prioritization system. The computing infrastructure includes a plurality of computing devices configured to implement computing applications. Execution of computing tasks associated with the computing applications is distributed amongst the plurality of computing devices. A memory of the application prioritization system stores computing task rules, which include, for each type of the computing tasks associated with the computing applications, a predefined value indicating an extent to which the type of the computing task is critical for meeting a predefined computing infrastructure demand. The application prioritization system receives application data associated with the computing applications. The application data includes, for each computing application, characteristics of the computing application and users of the computing application. A request is received for a priority of a first computing application of the computing applications compared to a second computing application of the computing applications. The application prioritization system determines, by applying a feedback-based machine learning model to at least a portion of the application data, the query, and the computing task rules, a first priority of the first computing application and a second priority of the second computing application and an explanation of the first and second priorities. The first and second priorities provide an indication of whether the first computing application or the second computing application is more critical to functions of the computing infrastructure. The application prioritization system provides a response with an indication of the larger of the first priority and second priority and the explanation.

In another embodiment, a computing infrastructure includes computing devices configured to implement computing applications accessible to users. Execution of computing tasks associated with the computing applications is distributed amongst the computing devices. A prioritization system includes a memory that stores an access record with, for each of the users, an indication of a previous usage of the computing applications. The memory stores a permission record with, for each of the users, an indication of the computing applications that the user is permitted to access. The memory stores user affinities that include, for each of the users, an affinity score corresponding to a predetermined ability level of the user to engage in an activity associated with one or more of the computing applications. The prioritization system determines, by performing a cluster analysis of the access record and the permission record, a usage cluster that includes, for each of the users, the previous usage of each of the computing applications that the user is permitted to access. The prioritization system determines, by performing a cluster analysis of the usage cluster and the user affinities, a usage affinity cluster that includes, for each of the users, the affinity scores corresponding to the predetermined ability levels of the user to engage in activities associated with the computing applications that the user is permitted to access. The prioritization system determines, based at least in part on the usage affinity cluster, a priority score for each of the users. In response to receiving a request for a priority of a first user of the users, the prioritization system provides a response with the priority score determined for the first user of the users.

In yet another embodiment, a computing infrastructure includes computing devices configured to implement computing applications accessible to users. Execution of computing tasks associated with the computing applications is distributed amongst the computing devices. A resource management system has a network interface operable to receive a set of application priorities corresponding to a predetermined ranking of the computing applications for satisfying predefined task requirements. The resource management system determines, based at least in part on the received set of application priorities, a resource allocation corresponding to a proposed distribution of the computing applications and the users amongst the computing devices of the computing infrastructure. The resource management system determines, using the resource allocation, a recommended device configuration for each of the computing devices. The recommended device configuration includes an indication of computing applications that should be installed on the computing device, users that should be permitted to access the computing device, and/or hardware resources that should be allocated to the computing device. The resource management system automatically implements the determined resource allocation by, at each of the computing devices of the computing infrastructure automatically installing the computing applications that should be installed on the computing device, automatically granting permission to the users that should be permitted to access the computing device, and/or automatically allocating the hardware resources that should be allocated to the computing device.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technology fails to provide definitive tools for efficiently and reliably managing computing application resource allocation. For instance, previous technology fails to provide understandable and actionable insights into the relative importance of a given application for meeting future needs (e.g., related to resources expended to remediate security vulnerabilities). For example, previous technology is unable to automatically identify computing applications that are more critical for ensuring required tasks can be efficiently and reliably completed in a timely manner. As such, the allocation of infrastructure (e.g., security vulnerability remediation efforts, server space, computing nodes, etc.) for executing these applications is inefficient and can fail to meet users' needs, such that certain required tasks may not be completed successfully or on time. The infrastructure monitoring and evaluation system described in this disclosure overcomes these and other problems of previous technology by providing efficient and reliable user-interpretable information about computing applications and associated hardware infrastructure and relative prioritization, such that appropriate decisions can be taken to improve system performance.

Application Management and Evaluation System

Figure 1:
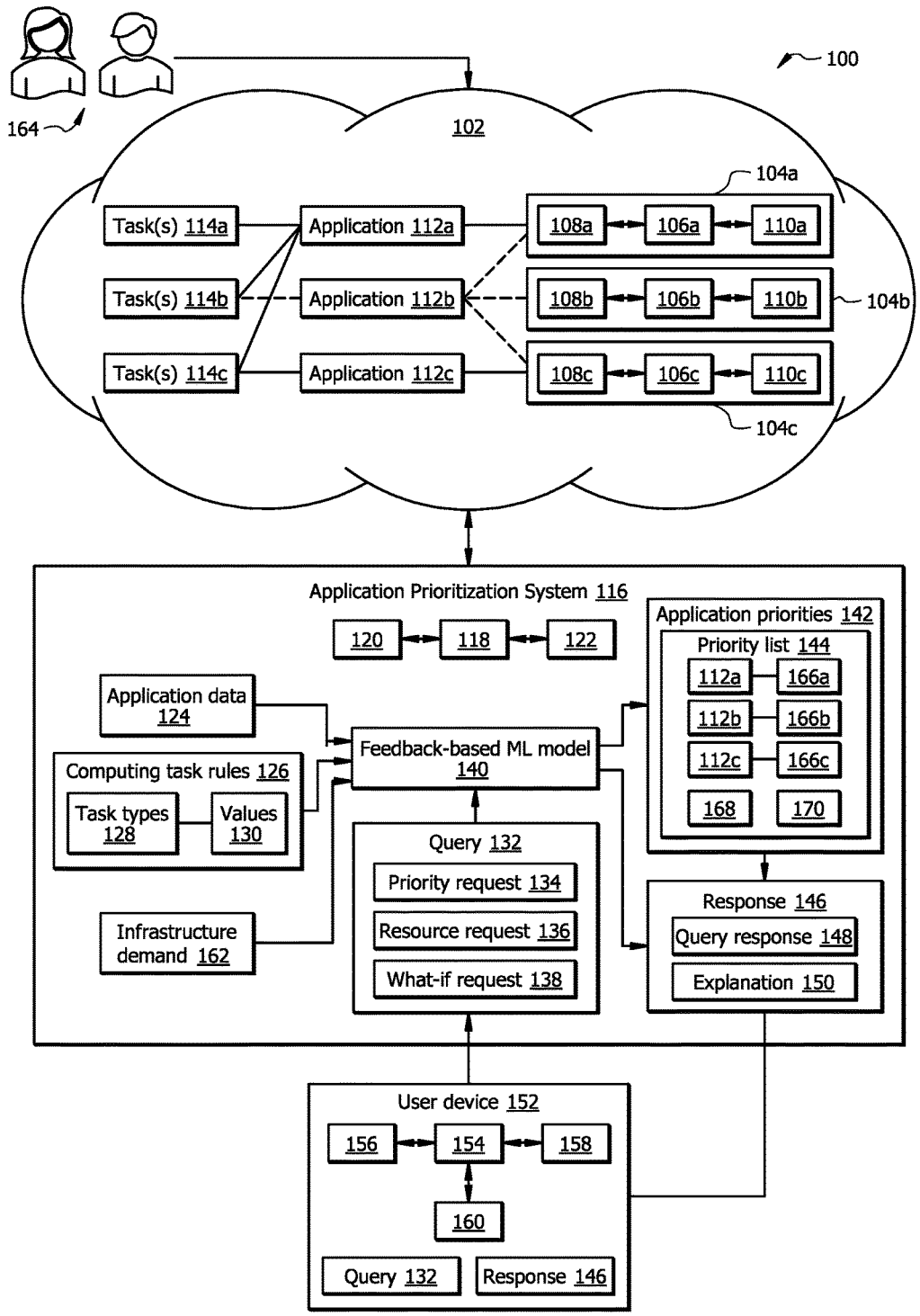
FIG. 1 is a schematic diagram of an example system configured for application prioritization, according to an embodiment of tis disclosure.

FIG. 1 is a schematic diagram of an example system 100 for improving the evaluation and management of computing applications 112*a-c* implemented in a computing infrastructure 102. The system 100 includes a computing infrastructure 102, an application prioritization system 116, and a user device 152. The system 100 generally facilitates the determination of application priorities 142 for the computing applications 112*a-c* implemented in (e.g., hosted by) the computing infrastructure 102. In some cases, the application priorities 142 may be specific to a received query 132 and may be determined based on application data 124 and/or predefined computing task rules 126, which include a predefined value 130 indicating an extent to which each type 128 of the computing task 114*a-c* associated with the computing applications 112*a-c* is critical for meeting a predefined computing infrastructure demand 162. The infrastructure demand 162 generally corresponds to the amount of computing tasks 114*a-c* expected to be performed during future times. The application priorities 142 may be used to generate a structured response 146 which may include not only a query response 148 that includes the information requested in the query 132 but also an explanation 150 in a natural language that provides context for the response 146, as described in greater detail below.

Computing Infrastructure

The computing infrastructure 102 may include any number of computing devices 104*a-c* that are operable to implement the computing applications 112*a-c*. The computing devices 104*a-c* may be located together or distributed in different locations. As illustrated in FIG. 1, each computing device 104*a-c* includes a processor 106*a-c*, memory 108*a-c*, and network interface 11*a-c*. The processor 106*a-c* of each of the computing devices 104*a-c* includes one or more processors. The processor 106*a-c* is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 106*a-c* may be a programmable logic device, a microcontroller, a microprocessor, or any suitable combination of the preceding. The processor 106*a-c* is communicatively coupled to and in signal communication with the memory 108*a-c* and the network interface 110*a-c*, and any other components of the device 104*a-c*. The one or more processors 106*a-c* are configured to process data and may be implemented in hardware and/or software. For example, the processor 106*a-c* may be 8-bit, 16-bit, 32-bit, 64-bit or of any other suitable architecture. The processor 106*a-c* may include an arithmetic logic unit (ALU) for performing arithmetic and logic operations, processor registers that supply operands to the ALU and store the results of ALU operations, and a control unit that fetches instructions from memory 108*a-c* and executes them by directing the coordinated operations of the ALU, registers and other components. In an embodiment, the function of the devices 104*a-c* described herein is implemented using logic units, FPGAs, ASICs, DSPs, or any other suitable hardware or electronic circuitry.

The memory 108*a-c* of each of the computing devices 104*a-c* is operable to store any data, instructions, logic, rules, or code operable to execute the functions of computing devices 104*a-c*. The memory 108*a-c* includes one or more disks, tape drives, or solid-state drives, and may be used as an over-flow data storage device, to store programs when such programs are selected for execution, and to store instructions and data that are read during program execution. The memory 108*a-c* may be volatile or non-volatile and may comprise read-only memory (ROM), random-access memory (RAM), ternary content-addressable memory (TCAM), dynamic random-access memory (DRAM), and static random-access memory (SRAM).

The network interface 110*a-c* of each of the computing devices 104*a-c* is configured to enable wired and/or wireless communications. The network interface 110*a-c* is configured to communicate data between the corresponding computing device 104*a-c* and other network devices, systems, or domain(s), such as the application prioritization system 116. The network interface 110*a-c* is an electronic circuit that is configured to enable communications between devices. For example, the network interface 110*a-c* may include one or more serial ports (e.g., USB ports or the like) and/or parallel ports (e.g., any type of multi-pin port) for facilitating this communication. As a further example, the network interface 110*a-c* may include a WIFI interface, a local area network (LAN) interface, a wide area network (WAN) interface, a modem, a switch, or a router. The processor 106*a-c* is configured to send and receive data using the network interface 110*a-c*. The network interface 110*a-c* may be configured to use any suitable type of communication protocol as would be appreciated by one of ordinary skill in the art. The network interface 110*a-c* communicates application data 124 to the application prioritization system 116, as described further below.

The computing devices 104*a-c* are generally configured to implement computing applications 112*a-c*. The computing applications 112*a-c* may be any software packages, programs, or code used, at least in part, to perform computing tasks 114*a-c*. For example, computing applications 112*a-c* may be hosted by the computing devices 104*a-c* of the computing infrastructure and accessed by users 164 to perform computing tasks 114*a-c*. Examples of computing tasks 114a-c include document generation, data analysis, report generation, electronic communication, database management, data presentation, media editing, media presentation, and the like. Each of the computing applications 112a-c is generally associated with one or more computing tasks 114a-c. For example, a word-processing application 112a-c may be associated with a report generation task 114a-c. More generally, a given computing application 112a-c may be associated with any number (i.e., one or more) computing tasks 114a-c. For instance, in the example of FIG. 1, the first computing application 112a is associated with three computing tasks 114a-b (e.g., a word-processing application 112a may be associated with a report generation task 114a, a table generation task 114b, and a general text preparation task 114c), while the second and third computing applications 112b,c are each associated with a single corresponding task 114b,c (e.g., a data analysis software application 112b and a database management application 112c may be associated with a data analysis task 114b and database management task 112c, respectively). The application prioritization system 116, described further below, generally identifies application priorities 142, such that critical tasks 114a-c can reliably be completed and such that resources of the computing infrastructure 102 (e.g., the processors 106a-c, memories 108a-c, and network interfaces 110a-c of the computing devices 104a-c) are appropriately allocated to complete critical tasks 114a-c.

The various computing tasks 114a-c associated with (e.g., performed using) the computing applications 112a-c may be distributed amongst the various computing devices 104a-c. For instance, as shown in the example of FIG. 1, all of the tasks 114a-c associated with the first computing application 112a may be performed by a single computing device 104a, while a single task 114b associated with the second computing application 112b may be distributed amongst multiple computing devices 104a-c. These distributions of computing tasks 114a-c and computing applications 112a-c amongst the computing devices 104a-c are examples only. Although FIG. 1 shows a particular number of computing tasks 114a-c being associated with each computing application 112a-c and being distributed amongst a given number of the computing device 104a-c, it should be understood that a computing application 112a-c may be associated with any appropriate number of computing tasks 114a-c, each of which may be distributed amongst any number of computing devices 104a-c to facilitate their execution.

Application Prioritization System

The application prioritization system 116 generally receives application data 124 from the computing infrastructure 102 along with a query 132 provided by a user device 152 and uses this information to determine application priorities 142 and/or a response 146 to the received query 132. As illustrated in the example of FIG. 1, the application prioritization system 116 includes a processor 118, memory 120, and network interface 122. The processor 118 of the application prioritization system 116 includes one or more processors. The processor 118 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 118 may be a programmable logic device, a microcontroller, a microprocessor, or any suitable combination of the preceding. The processor 118 is communicatively coupled to and in signal communication with the memory 120 and network interface 122. The one or more processors are configured to process data and may be implemented in hardware and/or software. For example, the processor 118 may be 8-bit, 16-bit, 32-bit, 64-bit or of any other suitable architecture. The processor 118 may include an arithmetic logic unit (ALU) for performing arithmetic and logic operations, processor registers that supply operands to the ALU and store the results of ALU operations, and a control unit that fetches instructions from memory 120 and executes them by directing the coordinated operations of the ALU, registers and other components. In an embodiment, the function of the application prioritization system 116 described herein is implemented using logic units, FPGAs, ASICs, DSPs, or any other suitable hardware or electronic circuitry.

The memory 120 of the application prioritization system 116 is operable to store any data, instructions, logic, rules, or code operable to execute the functions of the application prioritization system 116. The memory 120 may store the computing task rules 126, application data 124, infrastructure demand 162, instructions for implementing the feedback-based machine learning (ML) models 140, received queries 132, determined application priorities 142, determined responses 146, as well as any other logic, code, rules, and the like to execute functions of the application prioritization system 116. The memory 120 includes one or more disks, tape drives, or solid-state drives, and may be used as an over-flow data storage device, to store programs when such programs are selected for execution, and to store instructions and data that are read during program execution. The memory 120 may be volatile or non-volatile and may comprise read-only memory (ROM), random-access memory (RAM), ternary content-addressable memory (TCAM), dynamic random-access memory (DRAM), and static random-access memory (SRAM).

The network interface 122 of the application prioritization system 116 is configured to enable wired and/or wireless communications. The network interface 122 is configured to communicate data between the application prioritization system 116 and other network devices, systems, or domain(s), such as the computing infrastructure 102 and the user device 152. The network interface 122 is an electronic circuit that is configured to enable communications between devices. For example, the network interface 122 may include one or more serial ports (e.g., USB ports or the like) and/or parallel ports (e.g., any type of multi-pin port) for facilitating this communication. As a further example, the network interface 122 may include a WIFI interface, a local area network (LAN) interface, a wide area network (WAN) interface, a modem, a switch, or a router. The processor 118 is configured to send and receive data using the network interface 122. The network interface 122 may be configured to use any suitable type of communication protocol as would be appreciated by one of ordinary skill in the art. The network interface 122 receives the application data 124 and/or infrastructure demand 162 provided by the computing infrastructure 102 and communicates the response 146 for use by the user device 152.

The application prioritization system 116 may request and subsequently receive the application data 124 from the computing infrastructure 102. In some cases, the application prioritization system 116 may monitor operations of the computing infrastructure 102 to determine all or a portion of the application data 124 over time. The application data 124 generally includes characteristics of each of the computing applications 112a-c and users 164 of the computing applications 112a-c. For instance, the application data 124 may include an indication of coding language(s) employed by the computing applications 112a-c, training or skill levels of the users 164 of the computing applications 112a-c, number of users 164 of the computing applications 112a-c, an amount of time during which the computing applications 112a-c are used (e.g., or a frequency of use), an amount of time the computing applications 112a-c are used per user 164 (e.g., or a frequency of use per user 164), a predefined score indicating an extent to which the computing applications 112a-c are critical to meeting the infrastructure demand 162 (e.g., to execute one or more computing tasks 114a-c), and the like. In some embodiments, the application data 124 includes a current allocation of the computing tasks 114a-c associated with the computing applications 112a-c amongst the computing devices 104a-c of the computing infrastructure 102. For example, the application data 124 may indicate how many of the resources (e.g., processors 106a-c, memories 108a-c, and/or network interfaces 110a-c) are consumed to accomplish various tasks 114a-c and/or implement various computing applications 112a-c.

The application prioritization system 116 may similarly receive or determine the infrastructure demand 162. For example, the computing infrastructure 102 may provide an indication (e.g., as a schedule or the like) of upcoming computing tasks 114a-c expected to be executed by the computing infrastructure 102. Also or alternatively, the application prioritization system 116 may determine the infrastructure demand 162, for example, by monitoring usage of the computing infrastructure 102, identifying usage trends, and predicting the infrastructure demand 162 based on the trends.

The application prioritization system 116 receives a query 132, which includes at least one request 134, 136, 138. For example, the query 132 may include a priority request 134, such as a request for a priority of a first computing application 112a of the computing infrastructure 102 compared to that of a second computing application 112b of the computing infrastructure 102. As another example, the query 132 may include a resource request 136, such as a request for an amount of the computing infrastructure 102 (e.g., of the processors 106a-c, memories 108a-c, and/or network interfaces 110a-c) that is used to execute a given computing application 112a-c and/or complete a given computing task 114a-c. As yet another example, the query 132 may include a "what-if" request 138, such as request for an anticipated impact 170 of a scenario related to, for example, removal of a given computing application 112a-c from the computing infrastructure 102 and/or removal of a computing device 104a-c from the computing infrastructure 102.

The application prioritization system 116 determines, by applying a feedback-based ML model 140 to at least a portion of the application data 124, the query 132, the computing task rules 126, and/or the infrastructure demand 162, application priorities 142. The portion of the application data 124 to which the feedback-based ML model 140 is applied may not be pre-defined (e.g., by a user or administrator). For example, the portion of the application data 124 may be selected arbitrarily. In some cases, the portion of the application data 124 is derived via machine learning. The feedback-based ML model 140 generally employs a combination of one or more machine learning models and linear regression in an iterative fashion to determine an appropriate application prioritizations 142 for generating a response 146 to the received query 132. For example, the feedback-based ML model 140 may be applied to the application data 124, the query 132, and the computing task rules 126 to iteratively determine factors and corresponding weights for the first computing application 112a and the second computing application 112b (see FIG. 2 and corresponding description below). A first priority 166a (e.g., or a priority score) may be determined for the first computing application 112a based on the factors and weights for the first computing application 112a, and a second priority 166b (e.g., or a priority score) may be determined for the second computing application 112b based on the factors and weights determined for the second computing application 112b. The first and second priorities 166a,b provide an indication of whether the first computing application 112a or the second computing application 112b is more critical to functions of the computing infrastructure 102 (e.g., for meeting the infrastructure demand 162). The query response 148 may be determined from a comparison of these priorities 166a,b (e.g., such that the computing application 112a,b with the higher priority 166a,b is indicated as the higher priority computing application 112a,b in the query response 148). Further details of an example feedback-based ML model 140 and its implementation are described below with respect to FIG. 2.

The application priorities 142 may include a priority list 144 with the application priorities 166a-c determined for the computing applications 112a-c. For example, for a priority request 134 for an indication of a priority of a given computing application 112a compared to that of one or more other computing applications 112b,c the priority list 144 may include a ranking of the priorities 166a-c of these computing applications 112a-c. In some cases, the priority list 144 may be limited to information specifically associated with the query 132. For instance, if the priority request 134 corresponds to a request for a relative priority of the first computing application 112a compared to that of the second computing application 112b, processing resources of the application prioritization system 116 may be saved by limiting the analysis performed using the feedback-based ML model 140 to the computing applications 112a,b in question. As another example, for a resource request 136, the priority list 144 may include a ranked list of the amount 168 of the computing resources (e.g., the processors 106a-c, memories 108a-c, and/or network interfaces 110a-c) consumed by one or more of the computing applications 112a-c and/or one or more of the computing tasks 114a-c. As yet another example, for a what-if request 138, the priority list 144 may include an anticipated impact 170 of a scenario indicated by the what-if request 138.

The application prioritization system 116 then generates a response 146 to the query 132 (e.g., to one or more requests 134, 136, 138 included in the query 132). Appropriate entries from the priority list 144 may be selected to include in the query response 148. For example, for a priority request 134 associated with a comparison of a subset of all computing applications 112a-c, the portion of the relative application priorities 166a-c associated with the priority request 134 may be included in the query response 148. Similarly, the query response 148 may include the amount 168 of computing resources consumed by computing applications 112a-c and/or computing tasks 114a-c indicated in a given resource request 136. For a what-if request 138, the query response 148 generally includes the anticipated impact 170.

The application prioritization system 116 may further determine an explanation 150 to provide along with the query response 148. For example, for a priority request 134 for an indication of a relative priority of a given computing application 112a compared to that of one or more other computing applications 112b,c the explanation 150 may include a natural language description of the computing tasks 114a-c and/or associated analytical, organizational, or business needs that are being prioritized in order to reach the determined query response 148. For instance, if the query 132 includes a priority request 134 to compare the priority 166a of the first computing application 112a to the priority 166b of the second computing application 112b and the query response 148 indicates that the first computing application 112a has a higher priority 166a, the explanation 150 may include an indication of why the first computing application 112a has a higher priority 166a. For example, the explanation 150 may indicate that the first computing application 112a is prioritized because it can be used for a number of computing tasks 114a-c critical to the infrastructure demand 162, while the second computing application 112b is used for only a single computing task 114b, for a less critical computing task 114b, or the like. As another example, if the query 132 includes a resource request 136 to indicate the amount of computing resources expended to execute the first computing application 112a, the explanation 150 may include an indication of which computing tasks 114a-c are being executed by the various computing devices 104a-c. As yet another example, if the query 132 includes a what-if request 138 to indicate an anticipated impact 170 of a scenario associated with the what-if request 138, the explanation 150 may include an indication of computing tasks 114a-c, computing applications 112a-c, users 164, computing devices 104a-c, organizational/business, units, or the like that will experience a change in service because of the anticipated impact 170.

The response 146 is then provided to the user device 152, such that it may be reviewed and used as appropriate. User device 152 is described in greater detail below.

Figure 7:
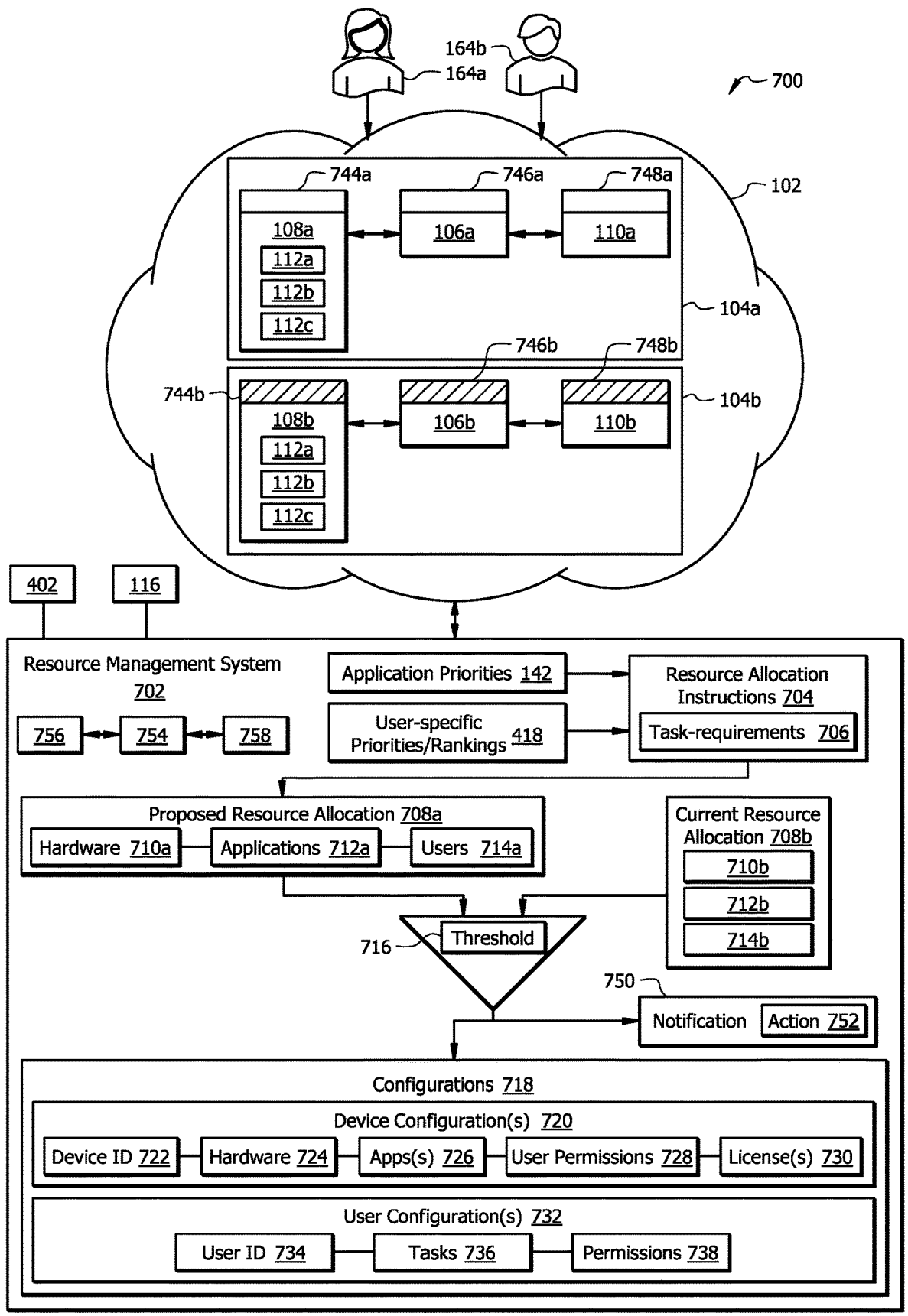
FIG. 7 is a schematic diagram of an example system configured for automatic resource management, according to an embodiment of this disclosure.

In some cases, the response 146 provides previously unavailable information for appropriately tuning the allocation of computing tasks 114a-c and/or computing applications 112a-c amongst the computing devices 104a-c of the computing infrastructure 102, such that the computing infrastructure 102 operates more efficiency and reliably (e.g., using the resource management system 702 of FIG. 7). For example, without the insights provided by the response 146, computing devices 104a-c assigned to certain tasks 114a-c and/or computing applications 112a-c may have been idle, while another computing device 104a-c was operating beyond its capacity and was unable to meet the infrastructure demand 162. The information provided in the response 146 generated by the application prioritization system 116 thus solves these and other technological problems of previous technology.

User Device

The user device 152 is generally a computer or other device, such a smart phone, tablet, personal assistant device, or the like, that is configured to receive a query 132 input by a user, provide the query 132 to the application prioritization system 116, receive the corresponding response 146, and provide a human-interpretable presentation of at least a portion of the response 146 (e.g., as displayed information, an audible message, or the like). The user device 152 includes a processor 154, memory 156, network interface 158, and output device 160. The processor 154 of the user device 152 includes one or more processors. The processor 154 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 154 may be a programmable logic device, a microcontroller, a microprocessor, or any suitable combination of the preceding. The processor 154 is communicatively coupled to and in signal communication with the memory 156, network interface 158, and output device 160. The one or more processors are configured to process data and may be implemented in hardware and/or software. For example, the processor 154 may be 8-bit, 16-bit, 32-bit, 64-bit or of any other suitable architecture. The processor 154 may include an arithmetic logic unit (ALU) for performing arithmetic and logic operations, processor registers that supply operands to the ALU and store the results of ALU operations, and a control unit that fetches instructions from memory 156 and executes them by directing the coordinated operations of the ALU, registers and other components. In an embodiment, the function of the user device 152 described herein is implemented using logic units, FPGAs, ASICs, DSPs, or any other suitable hardware or electronic circuitry.

The memory 156 of the user device 152 is operable to store any data, instructions, logic, rules, or code operable to execute the functions of the user device 152. The memory 156 may store the query 132 and corresponding response 146, as well as any other logic, code, rules, and the like to execute functions of the user device 152, for instance, for appropriately outputting the response 146 via the output device 160. The memory 156 includes one or more disks, tape drives, or solid-state drives, and may be used as an over-flow data storage device, to store programs when such programs are selected for execution, and to store instructions and data that are read during program execution. The memory 156 may be volatile or non-volatile and may comprise read-only memory (ROM), random-access memory (RAM), ternary content-addressable memory (TCAM), dynamic random-access memory (DRAM), and static random-access memory (SRAM).

The network interface 158 of the user device 152 is configured to enable wired and/or wireless communications. The network interface 158 is configured to communicate data between the user device 152 and other network devices, systems, or domain(s), such as the application prioritization system 116. The network interface 158 is an electronic circuit that is configured to enable communications between devices. For example, the network interface 158 may include one or more serial ports (e.g., USB ports or the like) and/or parallel ports (e.g., any type of multi-pin port) for facilitating this communication. As a further example, the network interface 158 may include a WIFI interface, a local area network (LAN) interface, a wide area network (WAN) interface, a modem, a switch, or a router. The processor 154 is configured to send and receive data using the network interface 158. The network interface 158 may be configured to use any suitable type of communication protocol as would be appreciated by one of ordinary skill in the art. The network interface 158 provides the query 132 and receives the corresponding response 146.

The output device 160 is any appropriate device for providing the received response 146 in a human-interpretable format, such as a textual, graphical, audible, and/or audiovisual format. For instance, the output device 160 may include a display device that presents the response 146 as text and/or graphically (e.g., as a table or plot illustrating the information included in the response 146). In some cases, the output device 160 may include a speaker for providing an audible indication of at least a portion of the response 146. For example a speaker may output an indication of the query response 148 and/or explanation 150 in any appropriate language.

In an example operation of the system 100 of FIG. 1, the application prioritization system 116 monitors usage of the computing infrastructure 102 to determine the application data 124 over a period of time. The application prioritization system 116 then determines the infrastructure demand 162 expected to be encountered in the future (e.g., based on computing tasks 114a-c performed over the period of time used to determine the application data 124). Meanwhile, the computing task rules 126 are stored in the application prioritization system 116, such that a value 130 indicative of the importance of each type 128 of the computing tasks 114a-c is available to aid in efficiently determining application priorities 142 using the feedback-based ML model 140.

At some point during operation of the system 100, a query 132 is received that includes a priority request 134 for the priority of the first computing application 112a compared to that of the second computing application 112b. For example, the priority request 134 may include the text "Should I prioritize the first application or the second application?" The application prioritization system 116 determines, by applying the feedback-based ML model 140 to the application data 124, the query 132, and the computing task rules 126, the relative priority 166a of the first computing application 112a compared to the priority 166b of the second computing application 112b. A query response 148 is determined from the priorities 166a,b. For example, the query response 148 may indicate that the first computing application 112a has a higher priority 166a than the priority 166b of the second computing application 112b. An explanation 150 of the relative priorities 166a,b is also determined. For example, the explanation 150 may indicate "The first application is higher priority because it is critical for a larger number of computing tasks that will be executed in the future." The response 146 that includes both the query response 148 and the explanation 150 is received by the user device 152 and may be used to ensure that the higher priority first computing application 112a is reliably serviced by administrators of the computing infrastructure 102 and is allocated sufficient resources of the computing infrastructure 102.

At another point during operation of the system 100, a query 132 is received that includes a resource request 136 for an amount 168 of the computing infrastructure 102 that is used to execute the first computing application 112a. For example, the resource request 136 may include "What resources of the computing infrastructure are used for the first application?" The application prioritization system 116 determines, by applying the feedback-based ML model 140 to at least the application data 124 and the query 132, the amount 168 of the computing infrastructure 102 that is used to execute the first computing application 112a. A query response 148 is determined from the determined amount 168. For example, the query response 148 may indicate that the first computing application 112a consumes a portion of the resources (e.g., the processors 106a-c, memories 108a-c, and network interfaces 110a-c) of the various computing devices 104a-c of the computing infrastructure. An explanation 150 of the amount 168 is also determined. For example, the explanation 150 may indicate "The first application consumes portions of the first application to execute the first and second tasks and resources of the second and third computing devices to execute the third computing task." The response 146 that includes both the query response 148 and the explanation 150 is received by the user device 152 and provides previously unavailable insights into the more granular operations of the computing infrastructure 102, which can be used to improve operation of the computing infrastructure 102.

At another point during operation of the system 100, a query 132 is received that includes a what-if request 138 for an anticipated impact 170 of a scenario corresponding to removal of the first computing application 112a from the computing infrastructure 102. For example, the what-if request 138 may include "What if the first application were no longer hosted by the computing infrastructure?" The application prioritization system 116 determines, by applying the feedback-based ML model 140 to at least the application data 124, the query 132, and the computing task rules 126, the anticipated impact 170 of the scenario. The anticipated impact 170 may indicate an amount of computing tasks 114a-c that would fail to be completed when the first computing application 112a is no longer hosted. The query response 148 is determined from the anticipated impact 170 (e.g., to indicate "the first, second, and third tasks would fail to be performed if the first application was no longer hosted."). An explanation 150 of the anticipated impact 170 may also be determined. For example, the explanation 150 may indicate "Removal of the first application is unadvised, because the first, second, and third computing tasks will become unavailable to users." The response 146 that includes both the query response 148 and the explanation 150 is received by the user device 152 and provides previously unavailable insights into the effects of possible changes to software implemented using the computing infrastructure 102.

At yet another point during operation of the system 100, a query 132 is received that includes a what-if request 138 for an anticipated impact 170 of a scenario corresponding to removal of the first computing device 104a from the computing infrastructure 102. For example, the what-if request 138 may include "What if the first computing device was uninstalled from the computing infrastructure?" The application prioritization system 116 determines, by applying the feedback-based ML model 140 to at least the application data 124, the query 132, and the computing task rules 126, the anticipated impact 170 of the scenario. The anticipated impact 170 may indicate an amount of computing tasks 114a-c and/or computing applications 112a-c that would fail to be completed or executed when the first computing device 104a is removed. The query response 148 is determined from the anticipated impact 170 (e.g., to indicate "the first, second, and third tasks would fail to be performed if the first computing device was removed."). An explanation 150 of the anticipated impact 170 may also be determined. For example, the explanation 150 may indicate "Removal of the first computing device is unadvised, because the remaining computing devices lack the capacity to complete these computing tasks." The response 146 that includes both the query response 148 and the explanation 150 is received by the user device 152 and provides previously unavailable insights into the effects of possible changes to the physical hardware of the computing infrastructure 102.

Example Operation of the Feedback-Based Machine Learning Model

Figure 2:
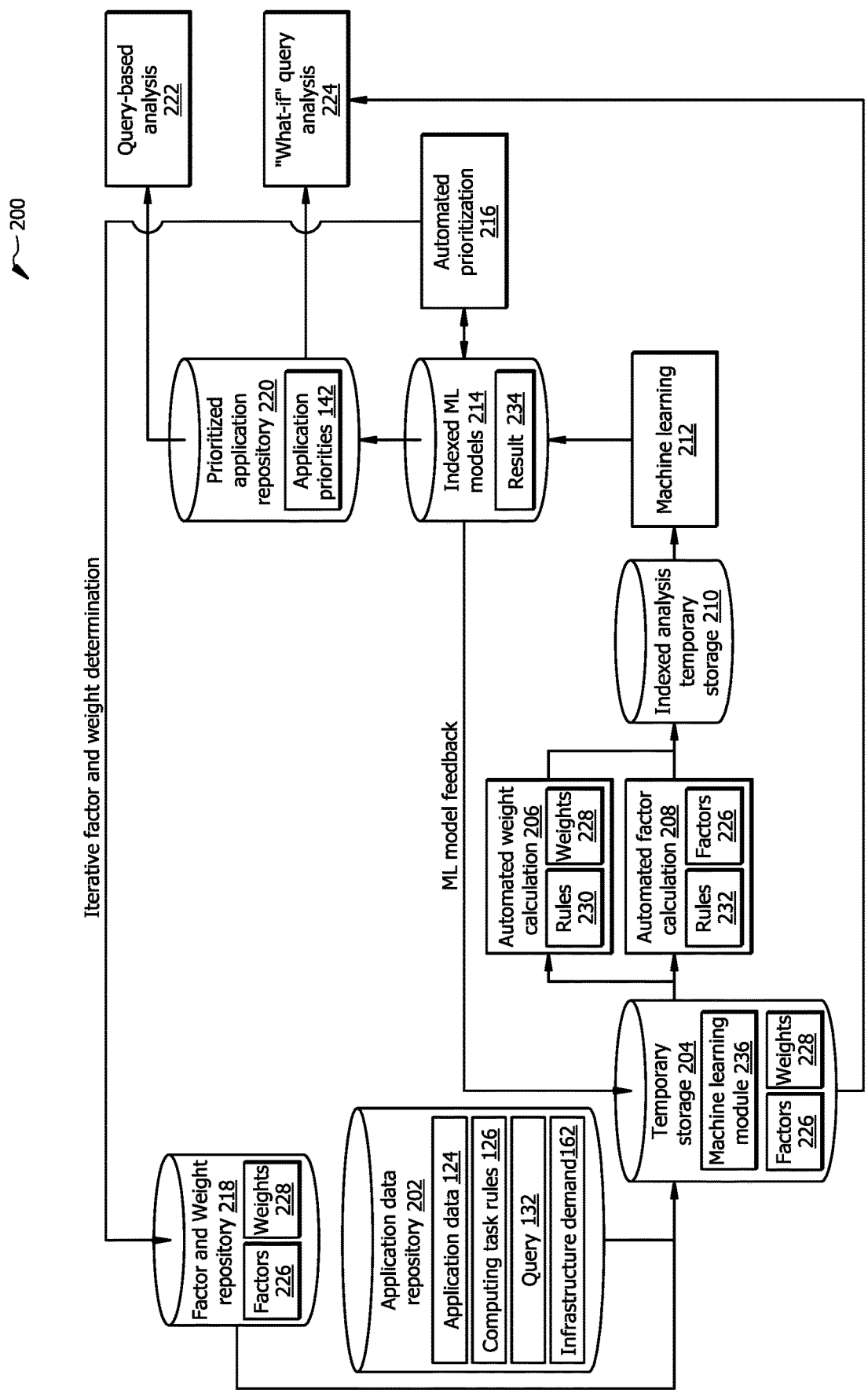
FIG. 2 is a flow diagram illustrating example operations associated with the application prioritization system of FIG. 1.

FIG. 2 is a flow diagram 200 illustrating an example implementation of the feedback-based ML model 140 of FIG. 1. Functions of the flow diagram 200 are generally performed using the processor 118, memory 120, and network interface 122 of the application prioritization system 116 of FIG. 1. For instance, the various repositories 202, 218 may be stored using the memory 120 of FIG. 1. Calculations 206, 208, machine learning 212, automated prioritization 216, and analyses 222, 224 may be performed using the processor 118 of FIG. 1. The flow diagram 200 includes two feedback loops, one for ML model feedback (e.g., to implement various indexed machine learning models 214) and another for iterative factor 226 and weight 228 determination as described in greater detail below.

The operation of the feedback-based ML model 140 may begin from the application data repository 202 and a factor and weight repository 218. The application data repository 202 may store the application data 124, computing task rules 126, query 132, and/or infrastructure demand 162 described with respect to FIG. 1 above. As such, the application data repository 202 may store application metadata for the applications 112a-c, including but not limited to information about names of the applications 112a-c, data operated on by the applications 112a-c, availability of the applications 112a-c, deployment zones of the applications 112a-c, training of users 164 of the applications 112a-c, programming languages used by the applications 112a-c, and the like.

The factor and weight repository 218 stores values for factors 226 and weights 228, which are iteratively determined by the feedback-based ML model 140. For example, factors 226 may be values that correspond to particular characteristics of the computing applications 112a-c, the computing tasks 114a-c performed with these computing applications 112a-c, the users 164 of the computing applications 112a-c, and the like. For instance, factors 226 may be values that correspond to a metric of a programming language used by a computing application 112a-c, may include but is not limited to an amount of training required for users 164 of a computing application 112a-c, an operational tier of a computing application 112a-c, and the like. As described further below, weights 228 for each of these factors 226 are iteratively refined to eventually perform an automated prioritization 216, which results in the determination of the application priorities 142 of FIG. 1. In the initial iteration, there may not be an initial value of the factors 226 and weights 228. Instead, values of the factors 226 and weights 228 may only be determined via subsequent steps of the flow diagram 200 (e.g., at calculations 206 and 208). These values are refined via iterations through the iterative factor 226 and weight 228 determination feedback loop.

In each iteration through the machine learning feedback loop, information from the application data repository 202, the factor and weight repository 218, and a machine learning model 236 from the indexed machine learning models 214 may be provided to and stored for a period of time in temporary storage 204 and used for the parallel automated weight calculation 206 and automated factor calculation 208. Automated weight calculation 206 corresponds to the determination of category weights 228 using linear regression techniques. Machine Learning and/or linear regression techniques may be combined with predefined rules 230 (e.g., minimax rules) to improve the calculation of the weights 228. Rules 230 may be a subset of all of the computing task rules 126 described above with respect to FIG. 1. The determined values of the weights 228 may be subject to predefined constraints included in the rules 230. For example, weights 228 for a user 164 training-related factor 226 may be constrained such that computing applications 112a-c for which users 164 have never been trained are assigned a higher weight 228 than computing applications 112a-c for which users 164 were trained long ago (e.g., greater than one year ago). The weights 228 are stored in the indexed analysis temporary storage 210 for later use.

Automated factor calculation 208 corresponds to the determination of values of the factors 226 using Machine Learning and/or linear regression techniques, which are the same as or similar to those used to determine the weights 228. Rules 232 may be used in combination with the linear regression techniques to determine the factors 226. Rules 232 may be a subset of all of the computing task rules 126 described above with respect to FIG. 1. The determined values of the factors 226 may be subject to predefined constraints included in the rules 232. For example, these constraints may indicate that features are prioritized in an arbitrary order including but not limited to: data value>data availability>deployment exposure>user training>native language. The factors 226 are stored in the indexed analysis temporary storage 210 for later use.

The indexed analysis temporary storage 210 provides working storage for output of the automated weight calculation 206 and automated factor calculation 208 (e.g., the factors 226 and weights 228), which are then provided as an input for machine learning 212, using the machine learning model 236 of the current iteration of the machine learning feedback loop. Machine learning 212 performs cluster analysis using the machine learning model 236 of the data received from the indexed analysis temporary storage 210. Cluster analysis may be configured to reduce the cluster size in order to determine values of the factors 226 and weights 228 to provide to the indexed machine learning models 214, which provides working storage for the results 234, factors 226, and weights 228.

The combination of automated weight calculation 206 and automated factor calculation 208 with machine learning 212 may involve the use of curve fitting to identify values of the factors 226 and weights 228 that best fits results 234 determined using a number of machine learning models 214 (e.g., by iteratively determining a result 234 for each iteration's machine learning model 236 of the indexed machine learning models 214). For example, a result 234 may be determined, for each indexed machine learning model 214, as the summation of the product of each pair of factors 226 and weight 228, according to $$\text{Result} = \sum_{k=0}^{k=n} \text{factor}(k) \times \text{weight}(k)$$

where there are n factors 226 and n corresponding weights 228. This process is repeated to determine results 234 using the different indexed machine learning models 214. These results 234 represent a linear space against which curve-fitting can be performed. To determine factors 226 and weights 228 that best fit the results 234. Error in the determination of the factors 226 and weights 228 may be reduced using ordinary least squares analysis and other related techniques.

The best-fit factors 226 and weights 228 determined for the results 234 are provided to the automated prioritization 216, which provides the factors 226 and weights 228 to the factor and weight repository 218 for use in the next iteration of the factor 226 and weight 228 determination loop. This process is generally repeated until the values of the factors 226, weights 228, and/or results 234 stabilize (e.g., change by less than a predefined amount) between iterations. If this is the case, the results 234 may correspond to the finalized application priorities 142. Otherwise, if the results 234 have not stabilized between iterations, the factors 226 and weights 228 are passed to automated prioritization 216, which provides the factors 226 and weights 228 to the factor and weight repository 218 for use in the next iteration of the factor 226 and weight 228 determination loop. This process is generally repeated until the results 234 and corresponding factors 226 and weights 228 are stabilized.

Once the results 234 are stabilized, the results 234 are provided to the prioritized application repository 220, where the results 234 are used to determine the application priorities 142 of FIG. 1. The application priorities 142 are then provided for query-based analysis 222 and/or what-if query analysis 224, depending on the type of request 134, 136, 138 included in the query 132. For example, if the query 132 included a priority request 134 and/or resource request 136, the results 234 may be provided to query-based analysis 222. If the query 132 included a what-if request 138, the results 234 may be provided to the what-if query analysis 224. Query-based analysis 222 generally selects information from the results 234 to include in the query response 148 and may further determine an appropriate explanation 150, as described with respect to FIG. 1 above. What-if query analysis 224 similarly uses the results 234 to determine the anticipated impact 170 of a scenario provided with a what-if request 138 and may further aid in determining an appropriate explanation 150.

Example Operation of the Application Prioritization System

Figure 3:
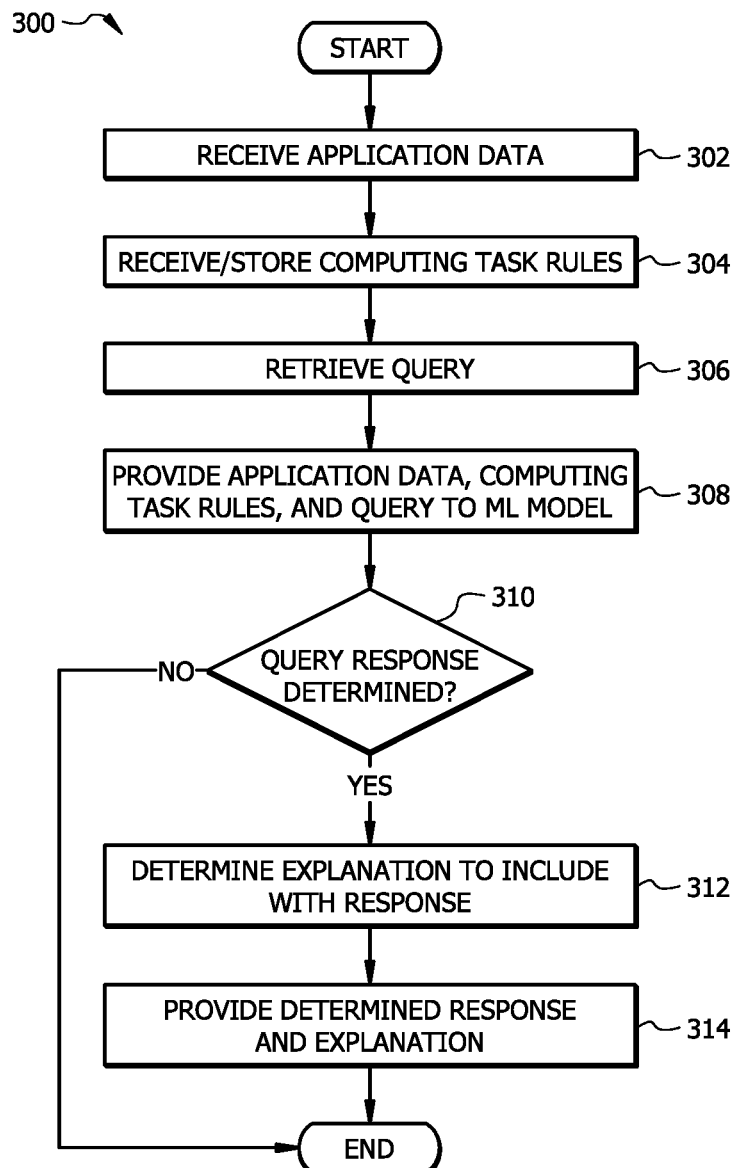
FIG. 3 is a flowchart of an example method of application prioritization using the system of FIG. 1.

FIG. 3 illustrates a method 300 for operating the system 100 of FIG. 1 in order to determine a response 146 to a received query 132. Method 300 may provide improved information in the form of response 146, which provides actionable information for more efficiently and reliably operating the computing infrastructure 102. The method 300 may be executed by the processor 118, memory 120, and network interface 122 of the application prioritization system 116. The method 300 may begin at step 302 where the application data 124 is received. As described above, the application data 124 generally includes characteristics of each of the computing applications 112a-c and users 164 of the computing applications 112a-c. Receiving the application data 124 at step 302 may involve providing a request and receiving a corresponding response that includes the application data 124 for the computing infrastructure 102. In some cases, receiving the application data 124 at step 302 involves monitoring the computing infrastructure 102 and its use and determining at least a portion of the application data 124.

At step 304, computing task rules 126 are received and/or stored (e.g., in the memory 120 of the application prioritization system 116). As described above, the computing task rules 126 include, for each type 128 of the computing tasks 114a-c associated with the computing applications 112a-c, a predefined value 130 indicating an extent to which the type 128 of the computing task 114a-c is critical for meeting a predefined computing infrastructure demand 162.

At step 306, a query 132 is received that includes one or more of a priority request 134, a resource request 136, and a what-if request 138, as described with respect to FIG. 1 above. The query 132 is generally provided from a user device 152 and may be received via the network interface 122 of the application prioritization system 116, as described with respect to FIG. 1 above.

At step 308, the application data 124, computing task rules 126, and query 132 are provided as an input to the feedback-based ML model 140. As described above with respect to FIGS. 1 and 2, the feedback-based ML model 140 may employ a combination of one or more machine learning models and linear regression in an iterative fashion to determine the application prioritizations 142. For example, the feedback-based machine learning model may be applied to the application data 124, the query 132, and the computing task rules 126 to iteratively determine factors and corresponding weights for the first computing application 112a and the second computing application 112b (see FIG. 2 and corresponding description above for further details of the feedback-based ML model 140 and its operation). These factors and weights may be used to determine the application prioritizations 142, and the application prioritization system 116 may select a portion of the application prioritizations 142 to include the query response 148.

At step 310, the application prioritization system 116 determines whether a query response 148 was successfully determined at step 308. For example, if the feedback-based ML model 140 successfully determined the application priorities 142 and/or query response 148 at step 308, then the application prioritization system 116 may determine that a query response 148 was determined. The application prioritization system 116 then proceeds to step 312. Otherwise, if a query response 148 was not successfully determined, the method 300 may end.

At step 312, the application prioritization system 116 determines an explanation 150 to include in the response 146. The explanation 150 may include a natural language description of the computing tasks 114a-c and/or associated analytical, organizational, or business needs that are being prioritized in order to obtain the query response 148. For instance, if the query 132 includes a priority request 134 to compare the priority 166a of the first computing application 112a to the priority 166b of the second computing application 112b and the query response 148 indicates that the first computing application 112a has a higher priority, the explanation 150 may include an indication of why the first computing application 112a has a higher priority 166a. Other examples of explanation 150 determined at step 312 are described with respect to FIG. 1 above.

At step 314, the response 146, which includes both the query response 148 determined by the feedback-based ML model 140 at step 308 and the explanation 150 from step 312, is provided (e.g., via network interface 122) to the user device 152 that sent the query 132 received at step 306. The provided response 146 includes information that was not previously efficiently or reliably available about operations and performance of the computing infrastructure 102 and may be used to improve operation of the computing infrastructure 102.

User and Application Prioritization System

Figure 4:
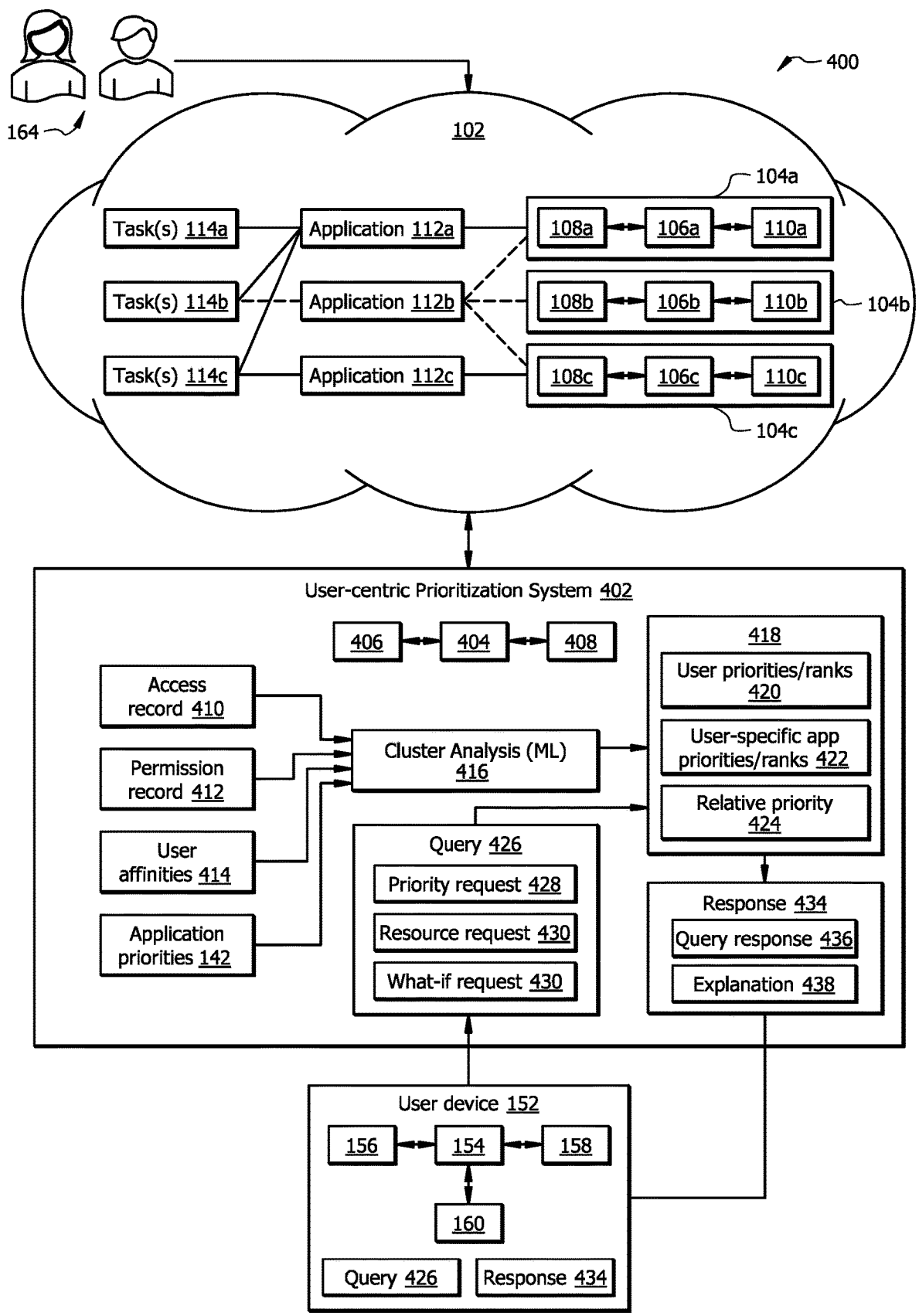
FIG. 4 is a schematic diagram of an example system configured for application and/or user prioritization, according to an embodiment of this disclosure.

FIG. 4 is a schematic diagram of an example system 400 for improving the evaluation and management of computing applications 112a-c implemented in a computing infrastructure 102 according to another embodiment of this disclosure. The system 400 includes a computing infrastructure 102 and user device 152 that are the same or similar to those described above with respect to FIG. 1. The system 400 includes a user-centric prioritization system 402. While the application prioritization system 116 of FIG. 1 generally provides information about the priorities 142 of applications 112a-c based on arbitrary application data 124 (see FIG. 1), the user-centric prioritization system 402 may determine user-specific priorities 418, including user priorities 420 and/or user-specific application priorities 422, using a different approach. The user-centric prioritization system 402 may perform cluster analysis 416 to determine user-specific priorities 418, as described in greater detail below and with respect to FIGS. 5 and 6.

As illustrated in the example of FIG. 4, the user-centric prioritization system 402 includes a processor 404, memory 406, and network interface 408. The processor 404 of the user-centric prioritization system 402 includes one or more processors. The processor 404 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 404 may be a programmable logic device, a microcontroller, a microprocessor, or any suitable combination of the preceding. The processor 404 is communicatively coupled to and in signal communication with the memory 406 and network interface 408. The one or more processors are configured to process data and may be implemented in hardware and/or software. For example, the processor 404 may be 8-bit, 16-bit, 32-bit, 64-bit or of any other suitable architecture. The processor 404 may include an arithmetic logic unit (ALU) for performing arithmetic and logic operations, processor registers that supply operands to the ALU and store the results of ALU operations, and a control unit that fetches instructions from memory 406 and executes them by directing the coordinated operations of the ALU, registers and other components. In an embodiment, the function of the user-centric prioritization system 402 described herein is implemented using logic units, FPGAs, ASICs, DSPs, or any other suitable hardware or electronic circuitry.

The memory 406 of the user-centric prioritization system 402 is operable to store any data, instructions, logic, rules, or code operable to execute the functions of the user-centric prioritization system 402. The memory 406 may store the access record 410, permission record 412, user affinities 414, application priorities 142, received queries 426, user-specific priorities 418, determined responses 434, as well as any other logic, code, rules, and the like to execute functions of the user-centric prioritization system 402. The memory 406 includes one or more disks, tape drives, or solid-state drives, and may be used as an over-flow data storage device, to store programs when such programs are selected for execution, and to store instructions and data that are read during program execution. The memory 406 may be volatile or non-volatile and may comprise read-only memory (ROM), random-access memory (RAM), ternary content-addressable memory (TCAM), dynamic random-access memory (DRAM), and static random-access memory (SRAM).

The network interface 408 of the user-centric prioritization system 402 is configured to enable wired and/or wireless communications. The network interface 408 is configured to communicate data between the user-centric prioritization system 402 and other network devices, systems, or domain(s), such as the computing infrastructure 102 and the user device 152. The network interface 408 is an electronic circuit that is configured to enable communications between devices. For example, the network interface 408 may include one or more serial ports (e.g., USB ports or the like) and/or parallel ports (e.g., any type of multi-pin port) for facilitating this communication. As a further example, the network interface 408 may include a WIFI interface, a local area network (LAN) interface, a wide area network (WAN) interface, a modem, a switch, or a router. The processor 404 is configured to send and receive data using the network interface 408. The network interface 408 may be configured to use any suitable type of communication protocol as would be appreciated by one of ordinary skill in the art. The network interface 408 receives the access record 410, permission record 414, user affinities 414, and/or application priorities 142 and communicates the response 434 for use by the user device 152.

As described in greater detail below with respect to FIGS. 5 and 6, the user-centric prioritization system 402 determines the user priorities 420 and/or the user-specific application priorities 422 using an access record 410, permission record 412, user affinities 414, and/or predetermined application priorities 142 (see FIGS. 1-3 and the corresponding description above regarding the determination of application priorities 142). For example, the user-centric prioritization system 402 may perform a series of cluster analyses 416 to determine the user priorities 420, as illustrated with respect to the example of FIG. 5, described below. The user priorities 420 generally correspond to a ranking of users 164 of the computing infrastructure 102 for completing required tasks 114a-c (see FIG. 5 for further details). The user priorities 420 may be used to allocate appropriate hardware resources (e.g., processors 106a-c, memories 108a-c, network interfaces 110a-c) to the computing devices 104a-c, such that the users 164 are able to reliably complete tasks 114a-c using the computing infrastructure 102. In some cases, the user priorities 420 may be used to allocate resources, such as software licenses, login credentials, training, etc., for using the computing infrastructure 102 to complete tasks 114a-c using computing applications 112a-c. In some embodiments, one or more of these reallocation tasks may be performed automatically, for example, using the resource management system 702, described with respect to FIGS. 7 and 8 below.

The user-centric prioritization system 402 may determine (e.g., using the cluster analysis 416a-c illustrated in FIG. 5), a usage cluster of the previous usage of each of the computing applications that each user 164 is permitted to access. The user-centric prioritization system 402 may then determine a usage affinity cluster that includes affinity scores corresponding to predetermined ability levels of users 164 to engage in activities associated with the computing applications 164 that the users 164 are permitted to access (see FIG. 5). The usage affinity cluster may be used alone or in combination with other information (e.g., the predetermined application priorities 142) to determine user priorities 420. As a non-limiting example, a user priority 420 for a given user 164 may be determined based on the application priorities 142, previous application usages indicated in the access record 410, and the affinities indicated in the user affinities 414. For instance, a user priority 420 may be determined as:

$$\text{user priority} = \sum_{n=1}^{M} (\text{application priority})_n (\text{usage})_n (\text{affinity})_n$$

where M is the number of computing applications 112a-c considered.

The access record 410 generally includes, for each of the users 164, an indication of a previous usage of the computing applications 112a-c. For example, the access record 410 may be a log of previous access to and amounts of time that the various computing applications 112a-c are used by the users 164. The permission record 412 includes an indication of the computing applications 112a-c that the users 164 are permitted, or allowed, to access. For example, the permission record 412 may be a list of computing applications 112a-c that each of the users 164 have permission to use (e.g., as established by an appropriate administrator).

The user affinities 414 generally correspond to the propensity for, or an ability level of, the users 164 to engage in different activities involving the computing applications 112a-c. For example, the user affinities 414 may correspond to predetermined ability levels of the user 164 to engage in activities that are performed at least in part using certain of the computing applications 112a-c. For example, one user 164 may have an affinity for using machine learning models and associated computing applications 112a-c, while another user 164 may have an affinity for preparing data visualizations and using associated computing applications 112a-c. The user affinities 414 may be determined as described for "reputation indicators" in U.S. patent application Ser. No. 17/100,437 filed Nov. 20, 2020 and entitled "IDENTIFYING USERS OF INTEREST VIA ELECTRONIC MAIL AND SECONDARY DATA ANALYSIS", which is incorporated herein by reference in its entirety.

In some cases, the user-centric prioritization system 402 determines user-specific application priorities 422 based at least in part on previous usage of the computing applications 112a-c by users 164 (e.g., from the access record 410) and the ability levels (or affinity scores 518a,b, 524a,b of FIG. 5) indicated by the user affinities 414 for activities engaged in by the users 164 using the computing applications 112a-c. As a non-limiting example, for each user 164, a user-specific application priority 422 (or priority score) for a given computing application 112a-c may be determined as a usage of the computing application 112a-c weighted by the affinity of the user 164 for engaging in activities using the computing application 112a-c (e.g., the affinity score 518a,b of a user 502 for an activity 514a,b associated with or performed using a computing application 516a,b see FIG. 5).

Figure 5:
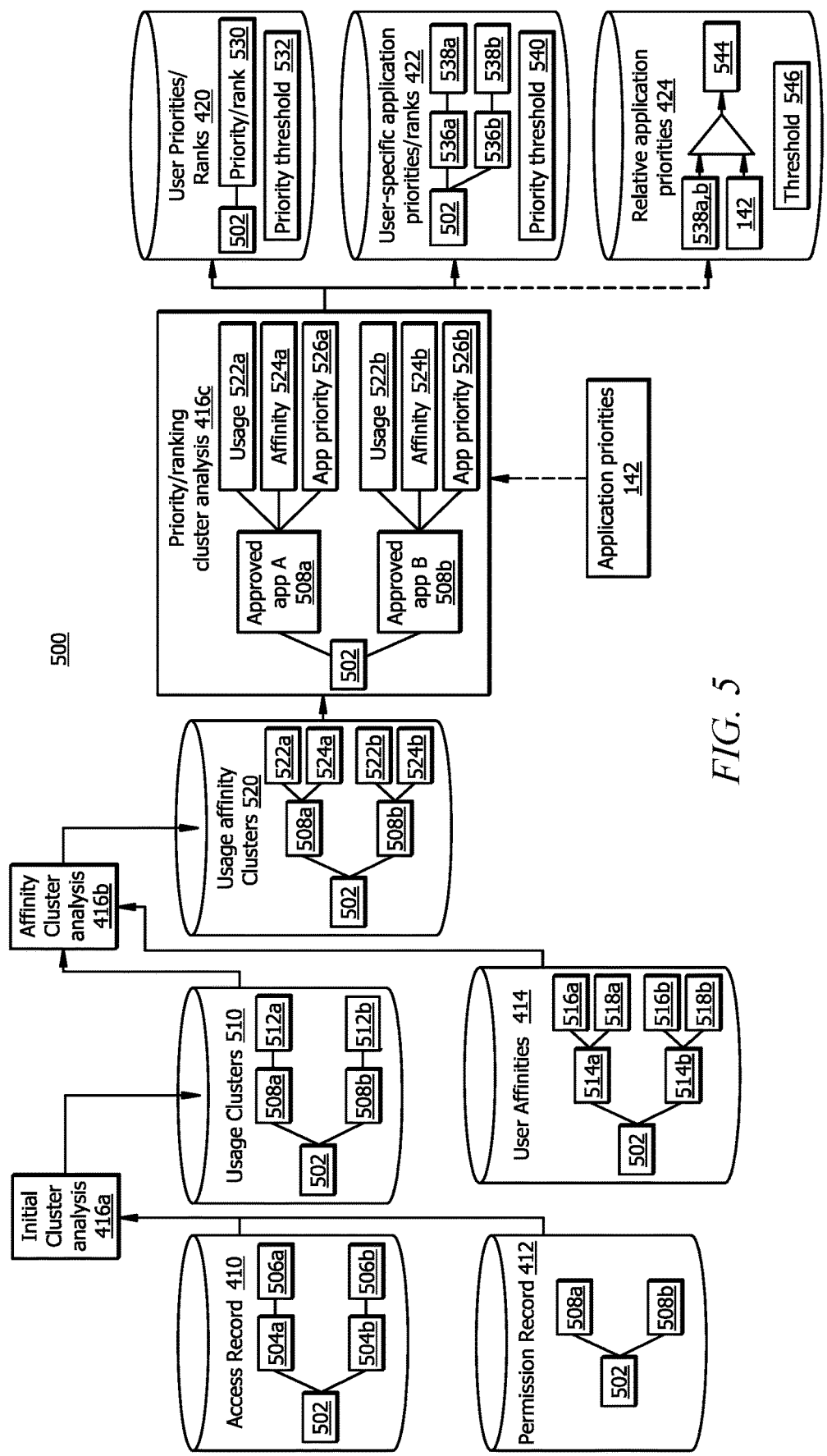
FIG. 5 is a flow diagram illustrating example operations for operating the system of FIG. 4.

The user-specific application priorities 422 generally correspond to the relative priorities or rankings of computing applications 112a-c based on their importance to users 164 for completing tasks 114a-c (see FIG. 5 for further details). The user-specific applications priorities 422 may be used to improve operation of the computing infrastructure in order for tasks 114a-c to be reliably completed by users 164, for example, adjusting allocation of hardware resources (e.g., processors 106a-c, memories 108a-c, network interfaces 110a-c) amongst the computing devices 104a-c. In some embodiments, one or more of resource allocation tasks based on the user-specific application priorities 422 may be performed automatically, for example, using the resource management system 702, described with respect to FIGS. 7 and 8 below.

Similarly to the application prioritization system 116 described above with respect to FIGS. 1-3, the user-centric prioritization system 402 may receive a query 426, which includes at least one request 428, 430, 432 for information. For example, the query 426 may include a user priority request 428, such as a request for a user priority 420 of a given user 164 compared to that of another user 164. As another example, the query 426 may include an application priority request 430, such as a request for a user-specific application priority 422 of a first computing application 112a for a given user 164 of the computing infrastructure 102 compared to another computing application 112b,c for the user 164. As yet another example, the query 426 may include a "what-if" request 432, such as request for an impact of some change to the computing infrastructure 102 and/or the users 164 on operation of the system 400 (e.g., the same as or similar to the anticipated impact 170 of a scenario described with respect to FIG. 1 above).

In response to receiving a query 426 (e.g., one or more of the requests 428, 430, 432), the user-centric prioritization system 402 provides a corresponding response 434. A response 434 may be generated using the user-specific priorities 418 similarly to the generation of the response 146 by the application prioritization system 116 of FIG. 1, described above. The response 434 generally includes at least a query response 436 with the requested information. The response 434 may further include an explanation 438 (e.g., as described with respect to the response 146 of FIG. 1). For example, the explanation 438 may include further information about the query response 436 to provide context about the query response 436. As an example, in response to a user priority request 428 for a priority of a given user 164, the user-centric prioritization system 402 provides a response 434 that includes the user priority 420 for the user 164 in the query response 436. The response 434 may further include an explanation 438 indicating information about the usage of the computing applications 112a-c often used by the user 164, affinities of the user 164, and the like.

In some cases, predetermined application priorities 142 may be used to determine a relative priority 424. In some embodiments, the relative priority 424 may correspond to a comparison of a user-specific application priorities 422 determined by the user-centric prioritization system 402 and a separate predetermined application priority 142 (see FIG. 1). As an example, the user-centric prioritization system 402 may compare a predetermined application priority 142 to a newly determined priority 422 (e.g., as a score or other quantitative value). If a difference, ratio, or other comparative metric between the predetermined application priority 142 and the determined priority 422 is greater than a threshold value, the response 434 (e.g., the explanation 438) may indicate that the predetermined application priority 142 should be updated. As an example, the relative priority 424 may be used to update operations of the application prioritization system 116 of FIG. 1 (e.g., to re-train the feedback-based ML model(s) 140 of FIGS. 1-3).

The response 434 is generally provided to the user device 152, such that it may be reviewed and used as appropriate. User device 152 is described in greater detail above. In some cases, the response 434 provides previously unavailable information for appropriately tuning the allocation of computing tasks 114a-c and/or computing applications 112a-c amongst the computing devices 104a-c of the computing infrastructure 102, such that the computing infrastructure 102 operates more efficiently and reliably (e.g., using the resource management system 702 of FIG. 7). For example, without the insights provided by the response 434, computing devices 104a-c assigned to certain tasks 114a-c and/or computing applications 112a-c may have been idle, while another computing device 104a-c was operating beyond its capacity and was unable to meet demand. The information provided in the response 434 generated by the application prioritization system 116 thus solves these and other technical problems of previous technology.

Example Operation of the User-Centric Prioritization System

FIG. 5 shows a flow diagram 500 illustrating an example operation of the user-centric prioritization system 402 of FIG. 4. Functions described with respect to the example of FIG. 5 are performed using the processor 404, memory 406, and network interface 408 of the user-centric prioritization system 402. Items described as being determined and/or stored (or illustrated in the example of FIG. 5) may be stored, at least temporarily, in memory 406 of the user-centric prioritization system 402.

The user-centric prioritization system 402 stores, in memory 406, the access record 410 and the permission record 412. As described above, the access record 410 includes, for user 502 (e.g., each individual user 502 of users 164), an indication of a previous usage 506a,b of computing applications 504a,b. Computing applications 504a,b are amongst the computing applications 112a-c described elsewhere in this disclosure. The permission record 412 includes, for each user 502, an indication of the computing applications 508a,b that the user 502 is permitted to access. The user-centric prioritization system 402 performs an initial cluster analysis 416a of the access record 410 and the permission record 412 to determine usage clusters 510. The usage clusters 510 include, for each user 502, the previous usage 512a,b of each of the computing applications 508a,b that the user 502 is permitted to access.

The user-centric prioritization system 402 stores user affinities 414, which, as described above, include, for each user 502, an affinity score 518a,b corresponding to a predetermined ability level of the user 502 to engage in an activity 514a,b associated with one or more of the computing applications 516a,b. For example, the affinity score 518a,b may correspond to how often the user 502 performs an activity 514a,b (e.g., performing a particular type of analysis, generating a certain type of work product, etc.) using an associated application 516a,b of computing applications 112a-c. For instance, a user 502 that is skilled at a machine learning activity 514a may have a high affinity score 518a for an application 516a used for machine learning. The affinity scores 518a,b may be predetermined for each user 502 and activity 514a,b or determined for the for "reputation indicators" in U.S. patent application Ser. No. 17/100,437 filed Nov. 20, 2020 and entitled "IDENTIFYING USERS OF INTEREST VIA ELECTRONIC MAIL AND SECONDARY DATA ANALYSIS", which is incorporated herein by reference in its entirety.

The user-centric prioritization system 402 performs an affinity cluster analysis 416b on the usage cluster 510 and the user affinities 414 to determine usage affinity clusters 520. The usage affinity clusters 520 include, for each user 502, affinity scores 524a,b corresponding to the predetermined ability levels of the user 502 to engage in activities 514a,b associated with the computing applications 508a,b that the user 502 is permitted to access. For instance, the usage affinity clusters 520 may include, for each user 502, a record of applications 508a,b that the user 502 is permitted to access and the previous usages 522a,b and affinity scores 524a,b of the user 502 for these permitted applications 508a,b.

The user-centric prioritization system 402 may perform a further priority cluster analysis 416c to determine, based at least in part on the usage affinity clusters 520, one or more of the user-specific priorities 418 described with respect to FIG. 1 above. The priority cluster analysis 416c may cluster each of the approved applications 508a,b for each user 502 according to the previous usages 522a,b, affinity scores 524a,b, and/or application priorities 526a,b (e.g., application priorities 526a,b indicated by predetermined application priorities 142—see FIGS. 1-3). As an example, the user-centric prioritization system 402 may use the priority cluster analysis 416c to determine user priorities 420 that include, for each user 502, a corresponding priority score 530. In some cases, the priority score 530 for a given user 502 may be compared to a priority threshold value 532. If the priority score 530 is greater than the priority threshold value 532, an administrator may be notified, such that appropriate actions may be taken, and/or an action may be taken automatically (e.g., using the resource management system 702 of FIG. 7). For instance, this scenario may correspond to the user 164 that corresponds to user 502 having an outsized responsibility, such that greater support should be provided to the user 164 and/or such that additional users 164 should be trained to provide a backup in case this user 164 becomes unavailable. In some cases, additional resources (e.g., hardware or software) may be made available to this user 164, such that the high priority user 164 is able to efficiently perform tasks 114a-c using the computing infrastructure 102.

As another example, the user-centric prioritization system 402 may use the priority cluster analysis 416c to determine user-specific application priorities 422, which include, for each user 502, an application priority score 538a,b for each of the computing applications 536a,b. In some cases, the priority score 538a,b for a given user 502/application 536a,b combination may be compared to a priority threshold value 540. If the threshold value 540 is exceeded, an administrator may be notified and/or an action may be taken automatically (e.g., using the resource management system 702 of FIG. 7). For example, if a first application priority score 538a for a first computing application 536a is greater than the predefined threshold value 540, the response 434 generated by the user-centric prioritization system 402 may indicate that the threshold 540 has been exceeded. In some, cases additional hardware resources may be allocated to support the high priority application 536a (e.g., using the resource management system 702 of FIG. 7, described below). Similarly, additional licenses or other resources for using the high priority application 536a may be acquired, more users 164 may be trained to operate the high priority application 536a, and the like.

As yet another example, the user-centric prioritization system 402 may use the priority cluster analysis 416c and the application priorities 142 predetermined by the application prioritization system 116 (see FIGS. 1-3) to determine relative application priorities 424. As described with respect to FIGS. 1-3 above, a predetermined application priority 142 may be determined based at least in part on application data 124 that includes, for each of computing applications 112a-c, characteristics of the computing application 112a-c and users 164 of the computing application 112a-c. The relative priority 424 may correspond to a comparison of a user-specific application priorities 422 determined by the user-centric prioritization system 402 and the predetermined application priority 142. As an example, if a difference, ratio, or other comparative metric 544 between the predetermined application priority 142 and the determined priority 422 is greater than a threshold value 546, the response 434 (e.g., the explanation 438) may indicate that the predetermined application priority 142 should be updated. As an example, the relative priority 424 may be used to update operations of the application prioritization system 116 of FIG. 1 (e.g., to re-train the feedback-based ML model(s) 140 of FIGS. 1-3).

Figure 6:
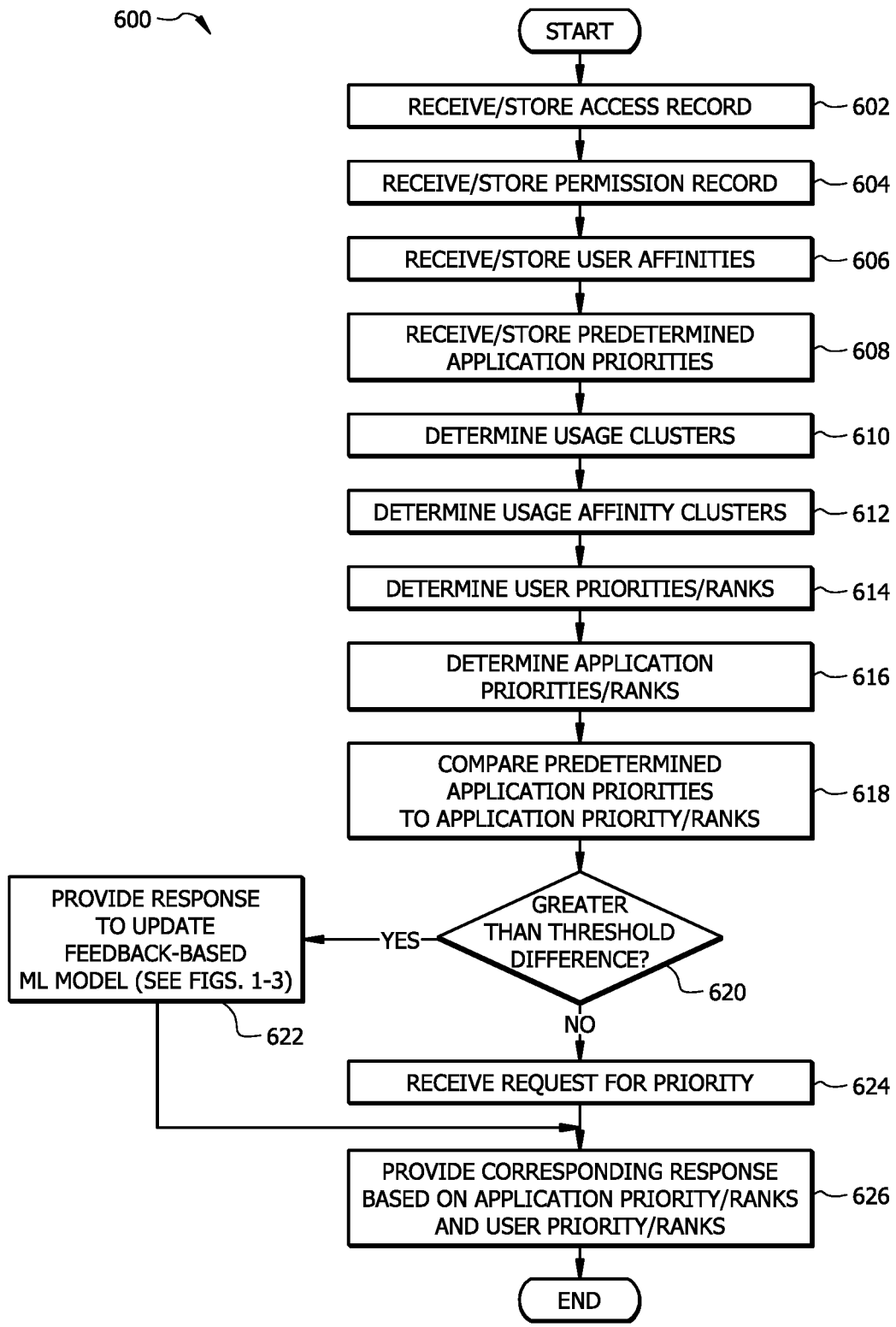
FIG. 6 is a flowchart of an example method of application and/or user prioritization using the system of FIG. 4.

FIG. 6 illustrates an example method 600 of operating the system 400 of FIG. 4. Method 600 may provide improved information in the form of user-specific priorities 418 and/or response 434, which include actionable information for more efficiently and reliably operating the computing infrastructure 102. The method 600 may be executed by the processor 404, memory 406, and network interface 408 of the user-centric prioritization system 402.

The method 600 may begin at step 602 where the user-centric prioritization system 402 stores the access record 410. As illustrated in FIG. 5, the access record 410 may include, for user 502 (e.g., where user 502 is one of the users 164), an indication of a previous usage 506a,b of the computing applications 504a,b. At step 604, the user-centric prioritization system 402 stores the permission record 412. As illustrated in FIG. 5, the permission record 412 may include, for each user 502, an indication of the computing applications 508a,b that the user 502 is permitted to access.

At step 606, the user-centric prioritization system 402 stores the user affinities 414. As illustrated in FIG. 5, the user affinities 414 may include, for each user 502, an affinity score 518a,b corresponding to a predetermined ability level of the user 502 to engage in an activity 514a,b associated with one or more of the computing applications 516a,b. At step 608, the user-centric prioritization system 402 stores one or more predetermined application priorities 142 determined by the application prioritization system 116 (see FIGS. 1-3). As described with respect to FIGS. 1-3 above, the application priorities 142 may include a priority list 144 with priorities 166a-c determined for the various computing applications 112a-c. The application priorities 142 generally are not specific to a given user 164.

At step 610, the user-centric prioritization system 402 determines the usage clusters 510 illustrated in FIG. 5. The user-centric prioritization system 402 may perform an initial cluster analysis 416a of the access record 410 and the permission record 412 to determine usage clusters 510. The usage clusters 510 include, for each user 502, the previous usage 512a,b of each of the computing applications 508a,b that the user 502 is permitted to access.

At step 612, the user-centric prioritization system 402 determines the usage affinity clusters 520 illustrated in FIG. 5. For example, the user-centric prioritization system 402 may perform an affinity cluster analysis 416a on the usage cluster 510 and the user affinities 414 to determine usage affinity clusters 520. The usage affinity clusters 520 include, for each user 502, affinity scores 524a,b corresponding to the predetermined ability levels of the user 502 to engage in activities 514a,b associated with the computing applications 508a,b that the user 502 is permitted to access.

At step 614, the user-centric prioritization system 402 determines user priorities 420. the user-centric prioritization system 402 may use the priority cluster analysis 416c to determine user priorities 420 that include, for each user 502, a corresponding priority score 530.

At step 616, the user-centric prioritization system 402 determines the user-specific application priorities 422. For example, the user-centric prioritization system 402 may use the priority cluster analysis 416c to determine user-specific application priorities 422, which include, for each user 502, an application priority score 538a,b for each of the computing applications 536a,b.

At step 618, the user-centric prioritization system 402 may compare one or more of the predetermined application priorities 142 (from step 608) to one or more corresponding user-specific application priorities 422 (from step 616). The comparison at step 618 may correspond to determining the relative priority 424 described with respect to FIGS. 4 and 5 above.

At step 620, the user-centric prioritization system 402 determines, based on the comparison performed at step 618, whether there is greater than a threshold 546 difference between the predetermined application priority(ies) 142 and the corresponding user-specific application priority(ies) 422. If this is the case, a response 434 may be provided that initiates updating of the application prioritization system 116, and particularly the feedback-based ML model 140, described with respect to FIG. 1 for improved operation of the application prioritization system 116. If the criteria of step 620 is not satisfied, then the user-centric prioritization system 402 proceeds to step 624.

At step 624, a query 426 is received that includes at least one request 428, 430, 432 for information. For example, the query 426 may include a user priority request 428, such as a request for a user priority 420 of a given user 164 compared to that of another user 164. As another example, the query 426 may include an application priority request 430, such as a request for a priority 422 of a first computing application 112a for a given user 164 of the computing infrastructure 102 compared to that of another computing application 112b,c.

At step 628, the user-centric prioritization system 402 identifies the information from the determined priorities 420, 422, 424 that correspond to an answer to the query 426. This identified information is provided as at least part of a response 434 that is provided to the query 426. The response 434 may be provided to a user device 152 that provided the query 426. In some cases, information from the response 434 (e.g., one or more of the priorities 420, 422, 424) may be provided to the resource management system 702 to automatically reallocate resources at the computing infrastructure 102 and thereby automatically and efficiently improve its performance.

Resource Management System

FIG. 7 illustrates a system 700 for automatically tuning confirmation of the computing infrastructure 102 for improved operation of the computing infrastructure 102. The system 700 includes the computing infrastructure 102, application prioritization system 116, and user-centric prioritization system 402 of FIGS. 1 and 4, described above, as well as a resource management system 702. The resource management system 702 is generally configured to automatically adjust resource allocation at the computing infrastructure 102, based at least in part on the application priorities 142 and user-specific priorities 418 described above, in order to provide access more efficiently and reliably to computing applications 112a-c. For example, the resource management system 702 may adjust the allocation of resources, such as memory 108a,b, processors 106a,b, and/or network interfaces 110a,b, to computing devices 104a,b. In some cases, the resource management system 702 may automatically install or uninstall computing applications 112a-c (and/or corresponding access credentials or license data) from the memory 108a,b to ensure appropriate tools are available to users 164a,b. In the example of FIG. 7, the resource management system 702 is shown being in communication with the application prioritization system 116 and user-centric prioritization system 402. However, it should be understood that one or more of the functions of each of these systems 116, 402 may be performed by the resource management system 702. For example, the resource management system 702 may include one or both of the application prioritization system 116 (see FIGS. 1-3) and the user-centric prioritization system 402 (see FIGS. 4-6).

As illustrated in the example of FIG. 7, the resource management system 702 is in communication (e.g., via network interface 758, described below) with the application prioritization system 116 (see FIGS. 1-3) and/or the user-centric prioritization system 402 (see FIGS. 4-6). The resource management system 702 may receive the application priorities 142 and/or user-specific priorities 418 from these systems 116, 402 and store them in memory 756. As described above with respect to FIGS. 1-6, the priorities 142, 418 may correspond to a predetermined ranking of computing applications 112a-c for satisfying predefined task requirements 706 (e.g., an amount or number or computing tasks 114a-c to be completed in a predefined amount of time or over an established period of time). The priorities 142, 418 are used, at least in part, to determine one or more proposed resource allocations 708a that are suited to the priorities 142, 418. The proposed resource allocation 708a may correspond to a distribution of hardware resources 710a (e.g., processors 106a-c, memory 108a-c, and/or network interfaces 110a-c), application resources 712a, and/or user resources 714a (e.g., users 164) amongst the computing devices 104a,b of the computing infrastructure 102.

As an example, a proposed resource allocation 708a may be determined using resource allocation instructions 704, which include task requirements 706. The resource allocation instructions 704 generally include logic, code, and/or rules for determining an appropriate proposed resource allocation 708a that will meet task requirements 706 while providing increased resources 710a, 712a, 714a for higher priority users 164 and/or applications 112a-c. The resource allocation instructions 704 may include a requirement that the proposed resource allocation 708a includes sufficient resources in the form of hardware resources 710a, application resources 712a, and user resources 714a for satisfying task requirements 706. The task requirements 706 may be a number or amount of tasks 114a-c (see FIGS. 1 and 4) that are to be completed in a predefined amount of time. For example, the resource allocation instructions 704 may include a requirement that a higher priority user 164a is allocated increased application resources 712a related to their work (e.g., including specialized applications 112a-c for data analysis, data presentation, machine learning-based modeling, etc.), while a lower priority user 164b may be provided only a predefined minimum allocation of application resources 712a (e.g., including basic communication, web browsing, word processing applications 112a-c).

The resource management system 702 uses the proposed resource allocation 702a, to determine particular configurations 718 for the users 164a,b and/or applications 112a-c. The configurations 718 include the levels of resources and other characteristics provided to applications (device configuration 720) and/or users (user configurations 732). As an example, a device configuration 720 for a given device 104a,b with a device identifier 722 may include: (1) hardware resources 724 (e.g., amount of processor 106a,b, memory 108a,b, and/or network interfaces 110a,b) that should be allocated to the computing device 104a,b; (2) an indication of computing applications 726 that should be installed on each computing device 104a,b; (3) user permissions 728 corresponding to the users 164a,b that should be permitted to access the computing devices 104a,b (and/or applications 726), and/or licenses 730 corresponding to data files needed to activate installed computing applications 112a-c such that they may be used by users 164. The device configuration(s) 720 may be used in the practical application of providing improved service at the computing infrastructure 102 for higher priority applications 112a-c, while generally not sacrificing performance for other computing applications 112a-c.

The user configuration(s) 732 may include for each user 164a,b corresponding to a given user identifier 734, tasks 736 which should be assigned to the user 164a,b (e.g., a workload that should be assigned to a user 164a,b to match the user's user priority 420 of FIG. 4) and/or permissions 738 that should be assigned to the user 164a,b to access computing applications 112a-c and/or computing devices 104a,b. The user configuration(s) 732 may be used for the practical application of improving the allocation of tasks 732 (e.g., from amongst the computing tasks 114a-c of FIGS. 1 and 4) to the users 164a,b. This may ensure that the users 164a,b are completing tasks 736 to which they are best suited (e.g., based on their affinities, usage history, access permissions—see FIGS. 4-6 and corresponding description above). Furthermore, the computing infrastructure 102 may provide improved performance (e.g., via increased access to certain computing applications 112a-c through permission 738) by allowing tasks 736 (e.g., at least a subset of the computing tasks 114a-c of FIGS. 1 and 4) to be completed in an efficient and timely manner.

The resource management system 702 generally automatically implements the proposed resource allocation 708a by establishing the configurations 718 described above. For example, the resource management system 702 may automatically allocate (or remove) hardware resources 724 that should be allocated to (or removed from) each computing device 104a,b based on the device configurations 720. The resource management system 702 may automatically install (or uninstall) one or more computing applications 112a-c at a given computing device 104a,b, based on the device configurations 720. The resource management system 702 may automatically grant (or deny) permission, based on user permission 728, to users 164a,b that should be permitted (or denied) to access each computing devices 104a,b. The resource management system 702 may automatically add (or remove) licenses for various applications 112a-c and/or users 164a,b, at each computing device 104a,b, based on the device configurations 720. For instance, the resource management system 702 may automatically allocate application licenses 730 to users 164a,b. As another example, the resource management system may automatically implement a user configuration 732 by changing a workload assignment for a user 164a,b (e.g., adding or removing tasks) and/or updating a record of the user's permission 738.

In some embodiments, the resource management system 702 may compare a proposed resource allocation 708a to the current resource allocation 708b of the computing infrastructure 708b before changes are automatically implemented. The current resource allocation 708b generally includes a current amount of hardware resources 710b, application resources 712b, and user resources 714b allocated to the computing devices 104a,b of the computing infrastructure 102. For example, if the current resource allocation 708b is already similar to the proposed resource allocation 708a, it may be preferred to not make any changes. As an example, the resource management system 702 may compare the proposed resource allocation 708a to the current resource allocation 708b of the computing infrastructure 102 and determine, based on this comparison, whether the proposed resource allocation 708a is at least a threshold amount 716 different than the current resource allocation 708b. Generally, if the threshold 716 is reached or exceeded, the resource management system 702 may proceed with automatically implementing the configurations 718 as described above. However, if the threshold 716 is not reached, no changes may be made to the computing infrastructure 102. This approach has the practical application of preventing resources from being expended for resource reallocation when only a relatively small performance gain would be achieved.

In some cases, one or more aspects of the configurations 718 may not be possible to perform automatically. In such cases, the notification 750 indicates an action 752 that should be performed to achieve the configurations 718. For example, the action 752 may be to acquire one or more licenses for users 164a,b. Another example action 752 is to train or recruit new users 164a,b to use a particular application 112a-c or perform center tasks 114a-c. The action 752 may be to physically install additional hardware resources 724 (e.g., if such resources are not able to be reconfigured between computing devices 104a,b and/or sufficient hardware resources 724 are not currently available).

The resource management system 702 includes a processor 754, memory 756, and network interface 758. The processor 754 of the resource management system 702 includes one or more processors. The processor 754 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 754 may be a programmable logic device, a microcontroller, a microprocessor, or any suitable combination of the preceding. The processor 754 is communicatively coupled to and in signal communication with the memory 756 and network interface 758. The one or more processors are configured to process data and may be implemented in hardware and/or software. For example, the processor 754 may be 8-bit, 16-bit, 32-bit, 64-bit or of any other suitable architecture. The processor 754 may include an arithmetic logic unit (ALU) for performing arithmetic and logic operations, processor registers that supply operands to the ALU and store the results of ALU operations, and a control unit that fetches instructions from memory 756 and executes them by directing the coordinated operations of the ALU, registers and other components. In an embodiment, the function of the resource management system 702 described herein is implemented using logic units, FPGAs, ASICs, DSPs, or any other suitable hardware or electronic circuitry.

The memory 756 of the resource management system 702 is operable to store any data, instructions, logic, rules, or code operable to execute the functions of the resource management system 702. The memory 756 may store the application priorities 142, user-specific priorities 418, resource allocation instructions 704, proposed resource allocations 708a, current resource allocations 708b, threshold 716, configurations 718, and notifications 750, as well as any other logic, code, rules, and the like to execute functions of the resource management system 702. The memory 756 includes one or more disks, tape drives, or solid-state drives, and may be used as an over-flow data storage device, to store programs when such programs are selected for execution, and to store instructions and data that are read during program execution. The memory 756 may be volatile or non-volatile and may comprise read-only memory (ROM), random-access memory (RAM), ternary content-addressable memory (TCAM), dynamic random-access memory (DRAM), and static random-access memory (SRAM).

The network interface 758 of the resource management system 702 is configured to enable wired and/or wireless communications. The network interface 758 is configured to communicate data between the resource management system 702 and other network devices, systems, or domain(s), such as the computing infrastructure 102, the application prioritization system 116, and the user-centric prioritization system 402. The network interface 758 is an electronic circuit that is configured to enable communications between devices. For example, the network interface 758 may include one or more serial ports (e.g., USB ports or the like) and/or parallel ports (e.g., any type of multi-pin port) for facilitating this communication. As a further example, the network interface 758 may include a WIFI interface, a local area network (LAN) interface, a wide area network (WAN) interface, a modem, a switch, or a router. The processor 754 is configured to send and receive data using the network interface 758. The network interface 758 may be configured to use any suitable type of communication protocol as would be appreciated by one of ordinary skill in the art. The network interface 758 receives the application priorities 142, user-specific priorities 418, and current resource allocation 708b and configurations 718 (e.g., and/or associated instructions for automatically implementing the configurations 718) and notification 750.

In an example operation of the resource management system 702, application priorities 142 and/or user-specific priorities 418 are received by the resource management system 702. In this example, the priorities 142, 418 indicate that a first computing application 112a has a higher priority than other computing applications 112b,c. The resource management system 702 then determines a proposed resource allocation 708a. The proposed resource allocation 708a includes an indication of hardware resources 710a that should be allocated to each computing device 104a,b, application resources 712a that should be available on each of the computing devices 104a,b, and user resources 714a corresponding to users 164 that should have access to each of the computing devices 104a,b (or the application resources 712a). If the proposed resource allocation 708a is at least the threshold amount 716 different from the current resource allocation 708b, then one or more configurations 718 may be determined to implement the proposed resource allocation 708a. For example, a device configuration 718 may be determined that adjusts the configuration of computing devices 104a,b. A user configuration 732 may also or alternatively be determined that adjusts the tasks 736 assigned to users 164a,b and/or permissions 738 granted to users 164a,b (e.g., to access certain applications 112a-c and/or computing devices 104a,b).

The configurations 718 are then automatically implemented. As an example, if computing device 104a is hosting the higher priority computing application 112a or is used by more users 164a,b of the higher priority computing application 112a, then memory resources 744a, processor resources 746a, and/or networking resources 748a may be increased for the computing device 104a. The resource management system 702 may also decrease (e.g., remove) memory resources 744b, processor resources 746b, and/or networking resources 748b from a computing device 104b that is used primarily for the access of lower priority computing applications 112b,c or users 164a,b of these applications 112b,c. The resource management system 702 may determine whether any aspects of the configurations 718 are not possible to achieve automatically and, if needed, provide a notification 750 that indicates an appropriate corrective action 252, such as obtaining additional hardware, training users 164, etc.

Similar functions to those described with respect to this example operation of system 700 may be performed to implement configurations 718 that are determined based on different received priorities 142, 418. For instance, similar resource reallocations to those described above may be performed if a user-specific priority 418 indicates that a first user 164a using the first computing device 104a is a higher priority user than the second user 164b of the second computing device 104b.

Example Operation of Resource Management System

Figure 8:
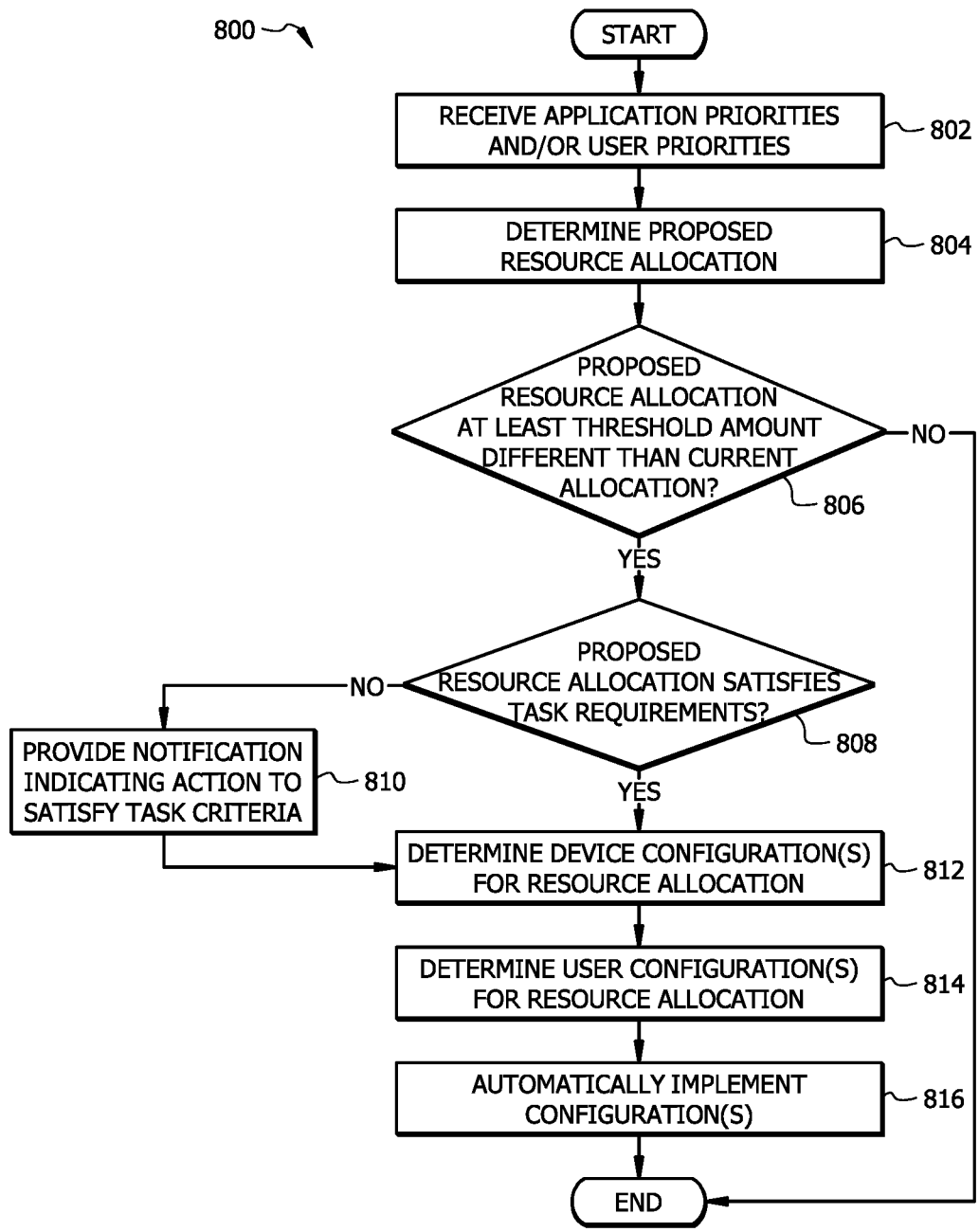
FIG. 8 is a flowchart of an example method of operating the system of FIG. 7.

FIG. 8 illustrates an example method 800 of operating the resource management system 702 of FIG. 7. Method 800 may provide improved performance of the computing infrastructure 102, such that higher priority users 164 and/or applications 112a-c are allocated with appropriate resources. The method 800 may be executed by the processor 754, memory 756, and network interface 758 of the resource management system 702. The method 800 may begin at step 802 where priorities 142, 418 are received. For example, the priorities 148, 418 may be received via the network interface 758 from one or both of the application prioritization system 116 and the user-centric prioritization system 402. In embodiments in which the resource management system 702 includes the application prioritization system 116 and/or the user-centric prioritization system 402, the priorities 142 and/or 418 may be determined as described above with respect to FIGS. 1-6.

At step 804, the resource management system 702 determines the proposed resource allocation 708a. As described above, the proposed resource allocation 708a may be determined by applying the resource allocation instructions 704, which include task requirements 706, to the priorities 142, 418. The resource management system 702 may determine the proposed resource allocation 708a as the distribution of resources 710a, 712a, 714a that satisfy the tasks requirements 706 (e.g., such that all appropriate tasks 114a-c of FIGS. 1 and 4 can be completed on time) and such that higher priority users 164 and computing applications 112a-c are allocated increased resources 710a, 712a, 714a when possible.

At step 806, the resource management system 702 may determine if the proposed resource allocation 708a is at least a threshold amount 716 different than the current resource allocation 708b of the computing infrastructure 102. If this is not the case, the method 800 may end. Otherwise, the resource management system 702 proceeds to step 808.

At step 808, the resource management system 702 determines whether the proposed resource allocation 708a will satisfy the task requirements 706. As described above, the task requirements 706 may be a number or amount of tasks 114a-c (see FIGS. 1 and 4) that are to be completed in a predefined amount of time. If the task requirements 706 are satisfied, the resource management system 702 proceeds to step 812. However, if the task requirements 706 are not satisfied, a notification 750 indicating a corrective action 752 may be provided. Examples of actions 752 indicated by a notification 750 are described in greater detail above with respect to FIG. 7. The resource management system 702 then proceeds to step 812.

At step 812, the resource management system 702 determines one or more device configurations 720 for achieving the proposed resource allocation 708a from step 804. For example, a device configuration 718 for a given device 104a,b with a device identifier 722 may include: (1) hardware resources 724 (e.g., amount of processor 106a,b, memory 108a,b, and/or network interfaces 110a,b) that should be allocated to the computing device 104a,b; (2) an indication of computing applications 726 that should be installed on each computing device 104a,b; (3) user permissions 728 corresponding to the users 164a,b that should be permitted to access the computing devices 104a,b (and/or applications 726), and/or licenses 730 corresponding to data files needed to activate installed computing applications 112a-c such that they may be used by users 164.

At step 814, the resource management system 702 determines one or more user configurations 732 for achieving the proposed resource allocation 708a from step 804. As described above with respect to FIG. 7, the user configuration(s) 732 may include for each user 164a,b corresponding to a given user identifier 734, tasks 736 which should be assigned to the user 164a,b (e.g., a workload that should be assigned to a user 164a,b to match the user's user priority 420 of FIG. 4) and/or permissions 738 that should be assigned to the user 164a,b to access computing applications 112a-c and/or computing devices 104a,b.

At step 816, the resource management system 702 automatically implements the configurations 720 and/or 732 from steps 812 and/or 814. The resource management system 702 may automatically allocate (or remove) hardware resources 724 that should be allocated to (or removed from) each computing device 104a,b based on the device configurations 720. The resource management system 702 may automatically install (or uninstall) one or more computing applications 112a-c at a given computing device 104a,b, based on the device configurations 720. The resource management system 702 may automatically grant (or deny) permission, based on user permission 728, to users 164a,b that should be permitted to access each computing devices 104a,b. The resource management system 702 may automatically add (or remove) licenses for various applications 112a-c, users 164a,b, at each computing device 104a,b, based on the device configurations 720. As another example, the resource management system may automatically implement a user configuration 732 by changing a workload assignment for a user 164a,b (e.g., adding or removing tasks) and/or updating a record of the user's permission 738.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:
1. A system, comprising:
a computing infrastructure comprising a plurality of computing devices configured to implement computing applications accessible to users, wherein execution of computing tasks associated with the computing applications is distributed amongst the plurality of computing devices; and a prioritization and resource management system comprising:
  a memory operable to store:
    an access record comprising, for each of the users, an indication of a previous usage of the computing applications;
    a permission record comprising, for each of the users, an indication of the computing applications that the user is permitted to access; and
    user affinities comprising, for each of the users, an affinity score corresponding to a predetermined ability level of the user to engage in an activity associated with one or more of the computing applications; and
  a processor communicatively coupled to the memory and configured to:
    determine, based upon the access record and the permission record, a usage cluster comprising, for each of the users, the previous usage of each of the computing applications that the user is permitted to access;
    determine, based upon the usage cluster and the user affinities, a usage affinity cluster comprising, for each of the users, the affinity scores corresponding to the predetermined ability levels of the user to engage in activities associated with the computing applications that the user is permitted to access;
    determine, based at least in part on the usage affinity cluster, a user priority score for each of the users;
    determine, for each of the users, an application priority score for each of the computing applications based on the previous usage of the computing applications and the affinity scores of the computing applications that the user is permitted to access;
    determine a proposed resource allocation for the computing infrastructure based on the determined user priority scores and the determined application priority scores; and
    in response to determining that the proposed resource allocation is at least a threshold amount different than a current resource allocation of the computing infrastructure:
      determine one or more device configurations for one or more of the computing devices of the computing infrastructure based on the proposed resource allocation; and
      allocate hardware resources to the one or more of the computing devices according to the one or more device configurations, wherein the one or more of the computing devices are configured to execute one or more second computing applications hosted by the one or more of the computing devices after allocating hardware resources to the one or more of the computing devices.

2. The system of claim 1, wherein the processor is further configured to determine the user priority score for each of the users by:
  receiving a predetermined application priority for each of the computing applications; and
  determining, for each of the users, the user priority score based on the received predetermined application priorities, the previous usages, and the affinity scores of the computing applications that the user is permitted to access.

3. The system of claim 1, wherein the processor is further configured to:
  determine that the user priority score for the first user is greater than a threshold value; and
  provide the response comprising an indication that the user priority score for the first user is greater than the threshold value.

4. The system of claim 1, wherein the processor is further configured to, for each of the computing applications:
  receive a predetermined application priority;
  compare the predetermined application priority to the determined application priority score;
  determine a difference between the predetermined application priority and the determined application priority score is greater than a threshold value; and
  in response to determining that the difference between the predetermined application priority and the determined application priority score is greater than the threshold value, provide the response indicating that the predetermined application priority should be updated.

5. The system of claim 4, wherein the predetermined application priority is determined based at least in part on application data comprising, for each of the computing applications, characteristics of the computing application and the users of the computing application.

6. The system of claim 1, wherein the processor is further configured to:
  determine that a first application priority score for a first computing application is greater than a predefined threshold value; and
  provide the response comprising an indication that the first application priority score is greater than the predefined threshold value.

7. A method comprising:
  storing:
    an access record comprising, for each user of a computing infrastructure, an indication of a previous usage of computing applications associated with the computing infrastructure, wherein the computing infrastructure comprises a plurality of computing devices configured to implement the computing applications, wherein execution of computing tasks associated with the computing applications is distributed amongst the plurality of computing devices;
    a permission record comprising, for each of the users, an indication of the computing applications that the user is permitted to access; and
    user affinities comprising, for each of the users, an affinity score corresponding to a predetermined ability level of the user to engage in an activity associated with one or more of the computing applications; and
  a processor communicatively coupled to the memory and configured to:
  determining, based upon the access record and the permission record, a usage cluster comprising, for each of the users, the previous usage of each of the computing applications that the user is permitted to access;
  determining, based upon the usage cluster and the user affinities, a usage affinity cluster comprising, for each of the users, the affinity scores corresponding to the predetermined ability levels of the user to engage in activities associated with the computing applications that the user is permitted to access;
  determining, based at least in part on the usage affinity cluster a user priority score for each of the users;

determining, for each of the users, an application priority score for each of the computing applications based on the previous usage of the computing applications and the affinity scores of the computing applications that the user is permitted to access;

determining a proposed resource allocation for the computing infrastructure based on the determined user priority scores and the determined application priority scores and in response to determining that the proposed resource allocation is at least a threshold amount different than a current resource allocation of the computing infrastructure:

determining one or more device configurations for one or more of the computing devices of the computing infrastructure based on the proposed resource allocation; and allocating hardware resources to the one or more of the computing devices according to the one or more device configurations, wherein the one or more of the computing devices are configured to execute one or more second computing applications hosted by the one or more of the computing devices after allocating hardware resources to the one or more of the computing devices.

8. The method of claim 7, further comprising determining the user priority score for each of the users by:

receiving a predetermined application priority for each of the computing applications; and determining, for each of the users, the user priority score based on the received predetermined application priorities, the previous usages, and the affinity scores of the computing applications that the user is permitted to access.

9. The method of claim 7, further comprising:

determining that the user priority score for the first user is greater than a threshold value; and providing the response comprising an indication that the user priority score for the first user is greater than the threshold value.

10. The method of claim 7, further comprising, for each of the computing applications:

receiving a predetermined application priority;

comparing the predetermined application priority to the determined application priority score;

determining a difference between the predetermined application priority and the determined application priority score is greater than a threshold value; and in response to determining that the difference between the predetermined application priority and the determined application priority score is greater than the threshold value, providing the response indicating that the predetermined application priority should be updated.

11. The method of claim 10, wherein the predetermined application priority is determined based at least in part on application data comprising, for each of the computing applications, characteristics of the computing application and the users of the computing application.

12. The method of claim 7, further comprising:

determining that a first application priority score for a first computing application is greater than a predefined threshold value; and providing the response comprising an indication that the first application priority score is greater than the predefined threshold value.

13. A system comprising:

a memory operable to store:

an access record comprising, for each user of a computing infrastructure, an indication of a previous usage of computing applications associated with the computing infrastructure, wherein the computing infrastructure comprises a plurality of computing devices configured to implement the computing applications, wherein execution of computing tasks associated with the computing applications is distributed amongst the plurality of computing devices;

a permission record comprising, for each of the users, an indication of the computing applications that the user is permitted to access; and user affinities comprising, for each of the users, an affinity score corresponding to a predetermined ability level of the user to engage in an activity associated with one or more of the computing applications; and a processor communicatively coupled to the memory and configured to:

determine, based upon the access record and the permission record, a usage cluster comprising, for each of the users, the previous usage of each of the computing applications that the user is permitted to access;

determine, based upon the usage cluster and the user affinities, a usage affinity cluster comprising, for each of the users, the affinity scores corresponding to the predetermined ability levels of the user to engage in activities associated with the computing applications that the user is permitted to access;

determine, based at least in part on the usage affinity cluster, a user priority score for each of the users;

determine, for each of the users, an application priority score for each of the computing applications based on the previous usage of the computing applications and the affinity scores of the computing applications that the user is permitted to access;

determine a proposed resource allocation for the computing infrastructure based on the determined user priority scores and the determined application priority scores; and in response to determining that the proposed resource allocation is at least a threshold amount different than a current resource allocation of the computing infrastructure:

determine one or more device configurations for one or more of the computing devices of the computing infrastructure based on the proposed resource allocation; and allocate hardware resources to the one or more of the computing devices according to the one or more device configurations, wherein the one or more of the computing devices are configured to execute one or more second computing applications hosted by the one or more of the computing devices after allocating hardware resources to the one or more of the computing devices.

14. The system of claim 13, wherein the processor is further configured to determine the user priority score for each of the users by:

receiving a predetermined application priority for each of the computing applications; and determining, for each of the users, the user priority score based on the received predetermined application priorities, the previous usages, and the affinity scores of the computing applications that the user is permitted to access.

15. The system of claim 13, wherein the processor is further configured to:
- Determine that the user priority score for the first user is greater than a threshold value; and
- provide the response comprising an indication that the user priority score for the first user is greater than the threshold value.

16. The system of claim 13, wherein the processor is further configured to, for each of the computing applications:
- receive a predetermined application priority;
- compare the predetermined application priority to the determined application priority score;
- determine a difference between the predetermined application priority and the determined application priority score is greater than a threshold value; and
- in response to determining that the difference between the predetermined application priority and the determined application priority score is greater than the threshold value, provide the response indicating that the predetermined application priority should be updated.

17. The system of claim 13, wherein the processor is further configured to:
- determine that a first application priority score for a first computing application is greater than a predefined threshold value; and
- provide the response comprising an indication that the first application priority score is greater than the predefined threshold value.

* * * * *